US011638066B2

(12) United States Patent　　(10) Patent No.: US 11,638,066 B2
Denoual et al.　　(45) Date of Patent: Apr. 25, 2023

(54) METHOD, DEVICE AND COMPUTER PROGRAM FOR ENCAPSULATING MEDIA DATA INTO A MEDIA FILE

(71) Applicant: CANON KABUSHIKI KAISHA, Tokyo (JP)

(72) Inventors: Franck Denoual, Saint Domineuc (FR); Naël Ouedraogo, Maure de Bretagne (FR); Frédéric Maze, Langan (FR); Jean Le Feuvre, Gometz-le-Chatel (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/291,863

(22) PCT Filed: Nov. 22, 2019

(86) PCT No.: PCT/EP2019/082192
§ 371 (c)(1),
(2) Date: May 6, 2021

(87) PCT Pub. No.: WO2020/109154
PCT Pub. Date: Jun. 4, 2020

(65) Prior Publication Data
US 2022/0014827 A1　　Jan. 13, 2022

(30) Foreign Application Priority Data
Nov. 29, 2018　(GB) ...................................... 1819501

(51) Int. Cl.
*H04N 21/84* (2011.01)
*H04N 21/235* (2011.01)
*H04N 21/845* (2011.01)

(52) U.S. Cl.
CPC ....... *H04N 21/845* (2013.01); *H04N 21/2353* (2013.01); *H04N 21/84* (2013.01)

(58) Field of Classification Search
CPC ... H04N 21/2353; H04N 21/84; H04N 21/845
(Continued)

(56) References Cited

U.S. PATENT DOCUMENTS

2015/0110473 A1\* 4/2015 Wang ..................... H04N 19/30
　　　　　　　　　　　　　　　386/341
2017/0223083 A1\* 8/2017 Maze ....................... H04L 65/65
(Continued)

FOREIGN PATENT DOCUMENTS

CN　　103098484 A　　5/2013
CN　　105052167 A　　11/2015
(Continued)

OTHER PUBLICATIONS

Franck Denoual, et al., [OMAF] Merging Sub-Picture Tracks, International Organisation for Standardisation, ISO/IEC JTC1/SC29/WG11 Coding of Moving Pictures and Audio, Jul. 2018, Ljubljana, SL, 6 pages, Doc. No. M43421, XP030197510.
(Continued)

*Primary Examiner* — Dominic D Saltarelli
(74) *Attorney, Agent, or Firm* — Canon U.S.A., Inc. IP Division

(57) ABSTRACT

A method and device for encapsulating media data into a media file and parsing a media file. The method comprising according to one of its aspects: including, in the media file, a first track comprising media samples, each media sample contains a set of one or more NAL units; including, in the media file, a second track comprising an extractor, the extractor is a structure referencing a data entity in a media sample contained in the first track; and including, in the extractor, a copy mode attribute that identifies, in the media sample, the referenced data entity relatively to one or more NAL units contained in the media sample.

13 Claims, 10 Drawing Sheets

(58) Field of Classification Search
USPC .......................................................... 725/116
See application file for complete search history.

(56) References Cited

U.S. PATENT DOCUMENTS

| | | | | |
|---|---|---|---|---|
| 2018/0295400 A1* | 10/2018 | Thomas | ............... | H04N 19/167 |
| 2019/0208234 A1* | 7/2019 | Van Brandenburg | ........................ | |
| | | | | H04N 21/234345 |
| 2021/0227231 A1* | 7/2021 | Hannuksela | ......... | H04N 19/105 |

FOREIGN PATENT DOCUMENTS

| | | | |
|---|---|---|---|
| CN | 108702503 | A | 10/2018 |
| EP | 2478703 | A2 | 7/2012 |
| WO | 2017/029400 | A1 | 2/2017 |

OTHER PUBLICATIONS

Franck Denoual, et al., Defect on Extractors, International Organisation for Standardisation, ISO/IEC JTC1/SC29/WG11 Coding of Moving Pictures and Audio, Jan. 2019, Marrakesh, MA, 5 pages, Doc. No. M46121, XP030214620.

Karsten Gruneberg, et al., HEVC Tile Subsets in 14496-15, International Organisation for Standardisation, ISO/IEC JTC1/SC29/WG11 Coding of Moving Pictures and Audio, Feb. 2016, San Diego, US, 8 pages, Doc. No. M37873, XP030066239.

* cited by examiner

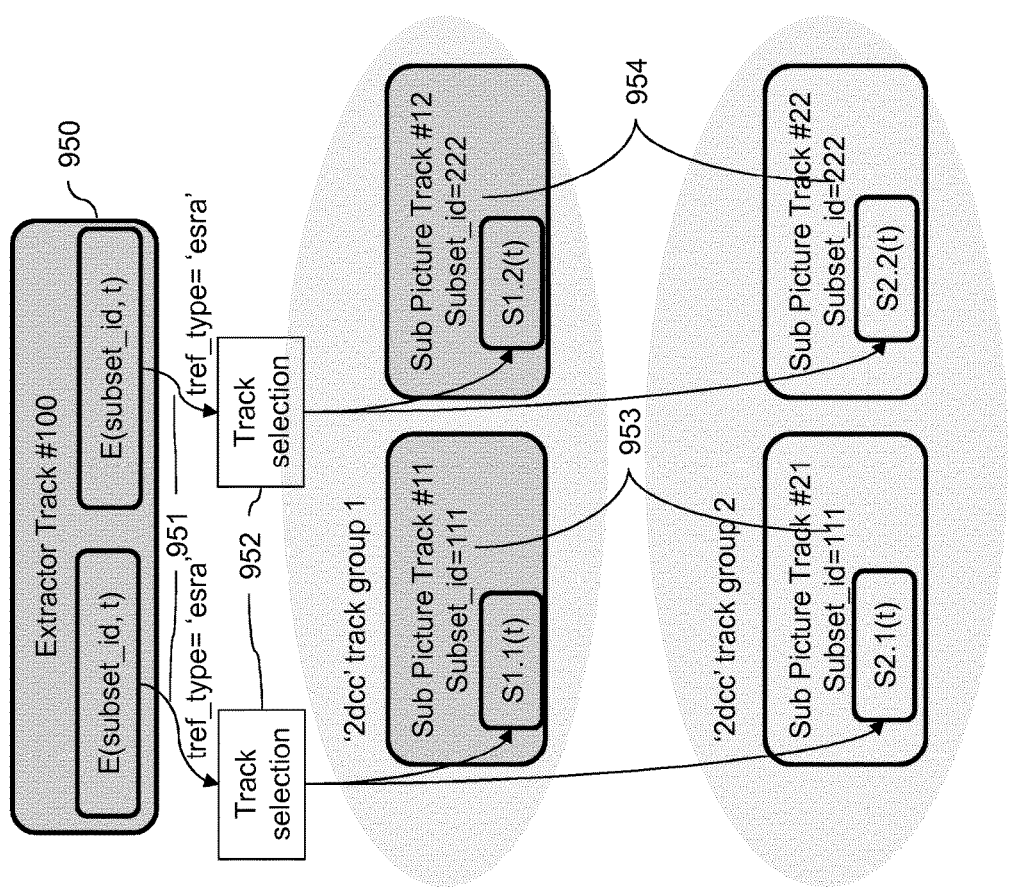
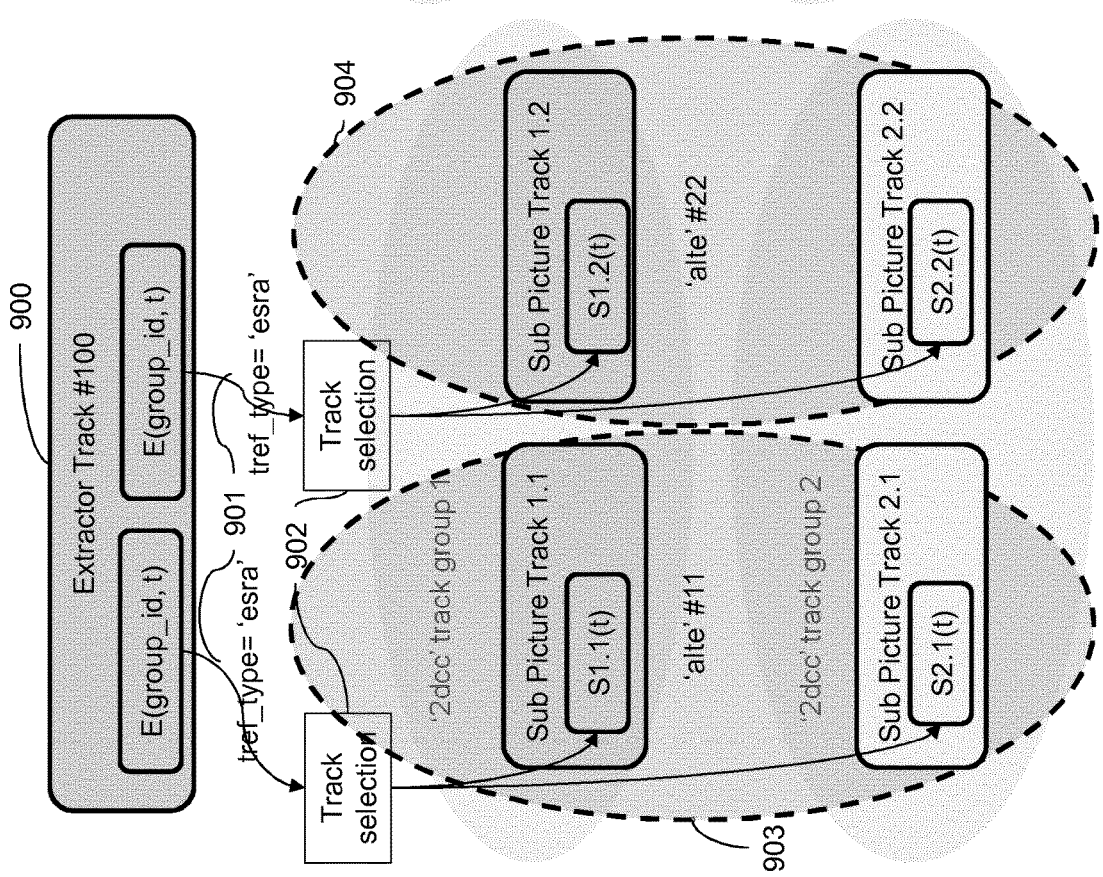
Fig. 9b
Fig. 9a

METHOD, DEVICE AND COMPUTER PROGRAM FOR ENCAPSULATING MEDIA DATA INTO A MEDIA FILE

CROSS-REFERENCE TO RELATED APPLICATIONS

This application is the National Phase application of PCT Application No. PCT/EP2019/082192, filed on Nov. 22, 2019 and titled "METHOD, DEVICE, AND COMPUTER PROGRAM FOR ENCAPSULATING MEDIA DATA INTO A MEDIA FILE". This application claims the benefit under 35 U.S.C. § 119(a)-(d) of United Kingdom Patent Application No. 1819501.6, filed on Nov. 29, 2018. The above cited patent applications are incorporated herein by reference in their entirety.

FIELD OF THE INVENTION

The present invention relates to methods and devices for encapsulating and transmitting media data.

BACKGROUND OF THE INVENTION

The International Standard Organization Base Media File Format (ISO BMFF, ISO/IEC 14496-12) is a well-known flexible and extensible format that describes encoded timed media data bitstreams either for local storage or transmission via a network or via another bitstream delivery mechanism. An example of extensions is ISO/IEC 14496-15 that describes encapsulation tools for various NAL (Network Abstraction Layer) unit based video encoding formats. Examples of such encoding formats are AVC (Advanced Video Coding), SVC (Scalable Video Coding), HEVC (High Efficiency Video Coding), and L-HEVC (Layered HEVC). Another example of file format extensions is ISO/IEC 23008-12 that describes encapsulation tools for still images or sequence of still images such as HEVC Still Image. Another example of file format extensions is ISO/IEC 23090-2 that defines the omnidirectional media application format (OMAF). The ISO Base Media file format is object-oriented. It is composed of building blocks called boxes (or data structures characterized by a four characters code) that are sequentially or hierarchically organized and that define parameters of the encoded timed media data bit-stream such as timing and structure parameters.

In the file format, the overall presentation is called a movie. The movie is described by a movie box (with the four character code 'moov') at the top level of the media or presentation file. This movie box represents an initialization information container containing a set of various boxes describing the presentation. It is logically divided into tracks represented by track boxes (with the four character code 'trak'). Each track (uniquely identified by a track identifier (track_ID)) represents a timed sequence of media data belonging to the presentation (frames of video, for example). Within each track, each timed unit of data is called a sample; this might be a frame of video, audio or timed metadata. Samples are implicitly numbered in sequence. The actual sample data are stored in boxes called Media Data Boxes (with the four character code 'mdat') at the same level as the movie box. A description of the samples is stored in the metadata part of the file in a SampleTableBox. The movie can be organized temporally as a movie box containing information for the whole presentation followed by a list of couple movie fragment and Media Data boxes. Within a movie fragment (box with the four character code 'moof') there is a set of track fragments (box with the four character code 'traf'), zero or more per movie fragment. The track fragments in turn contain zero or more track run boxes ('trun'), each of which document a contiguous run of samples for that track fragment.

An ISOBMFF file may contain multiple encoded timed media data bitstreams or sub-parts of encoded timed media data bitstreams forming multiple tracks. When sub-parts corresponds to one or successive spatial parts of a video source, taken over the time (e.g. at least one rectangular region, sometimes called 'tile', taken over the time), the corresponding multiple tracks may be called sub-picture tracks. ISOBMFF and its extensions comprise several grouping mechanisms to group together tracks, static items, or samples. A group typically shares common semantic and/or characteristics.

The inventors have noticed several problems when describing and signaling information about the media data to transmit, in particular for multiple tracks when one track is referencing another track.

An example involves the signaling of a data entity that is referenced in another track that requests a specific parsing process from the client, which generates overhead and is complex.

Another example concerns the signaling of data entities to be copied from groups of tracks for forming a composite track, in particular when the composition track is depending on the type of relationship between these groups of tracks.

The existing solutions are either complex or not well defined and not fully compliant with existing mechanisms for composing tracks from groups of tracks.

SUMMARY OF THE INVENTION

The present invention has been devised to address one or more of the foregoing concerns.

In this context, there is provided a solution for streaming media content (for example omnidirectional media content), for example over an IP network such as Internet using the http protocol.

According to a first aspect of the invention there is provided a method for encapsulating media data into a media file, the method comprising:

including, in the media file, a first track comprising media samples, each media sample contains a set of one or more NAL units;

including, in the media file, a second track comprising an extractor, the extractor is a structure referencing a data entity in a media sample contained in the first track; and including, in the extractor, a copy mode attribute that identifies, in the media sample, the referenced data entity relatively to one or more NAL units contained in the media sample.

In particular, the copy mode attribute is set to one of a list of one or more modes.

In an embodiment, the list of modes comprises one or more of the following modes:

a first mode in which the data entity comprises all the set of NAL units contained in the sample;

a second mode in which the data entity comprises one NAL unit of the set of NAL units;

a third mode in which the data entity comprises the payload of one NAL unit of the set of NAL units;

a fourth mode in which the data entity comprises a NAL unit at a specified position in the set of NAL units; and a fifth mode in which the data entity comprises a payload of a NAL unit at a specified position in the set of NAL units.

In one implementation, in the second or third modes, the NAL unit is the first NAL unit in the sample.

In one implementation, in the second or third modes, the NAL unit is the last NAL unit in the sample.

According to a second aspect of the invention there is provided a method for generating a media file, comprising:

encoding media content into media data;

encapsulating the media data into a plurality of tracks, according to the encapsulating method disclosed above; and generating at least one media file comprising the encapsulated media data.

According to a third aspect of the invention there is provided a method for transmitting a media file, comprising:

generating a media file by a server device according to the method described above; and transmitting the generated media file to a client device.

According to a fourth aspect of the invention there is provided a method for parsing a media file to generate media data, the method comprising:

obtaining, from the media file, a first track comprising an extractor, the extractor is a structure referencing a data entity in a media sample contained in a second track;

obtaining, from the media file, the second track comprising media samples, each media sample contains a set of one or more NAL units; and obtaining, from a media sample of the second track, a data entity identified by a copy mode attribute included in the extractor;

wherein the copy mode attribute identifies, in the media sample, the referenced data entity relatively to one or more NAL units contained in the media sample.

Other aspects of the invention concern a computing device for encapsulating a media data and parsing a media file, and a corresponding computer program.

BRIEF DESCRIPTION OF THE DRAWINGS

Further advantages of the present invention will become apparent to those skilled in the art upon examination of the drawings and detailed description. It is intended that any additional advantages be incorporated herein.

Embodiments of the invention are described below, by way of examples only, and with reference to the following drawings in which:

FIGS. 9a and 9b illustrate example of explicit reconstruction from a set or from a group of tracks.

DETAILED DESCRIPTION OF EMBODIMENTS OF THE INVENTION

Figure 1:
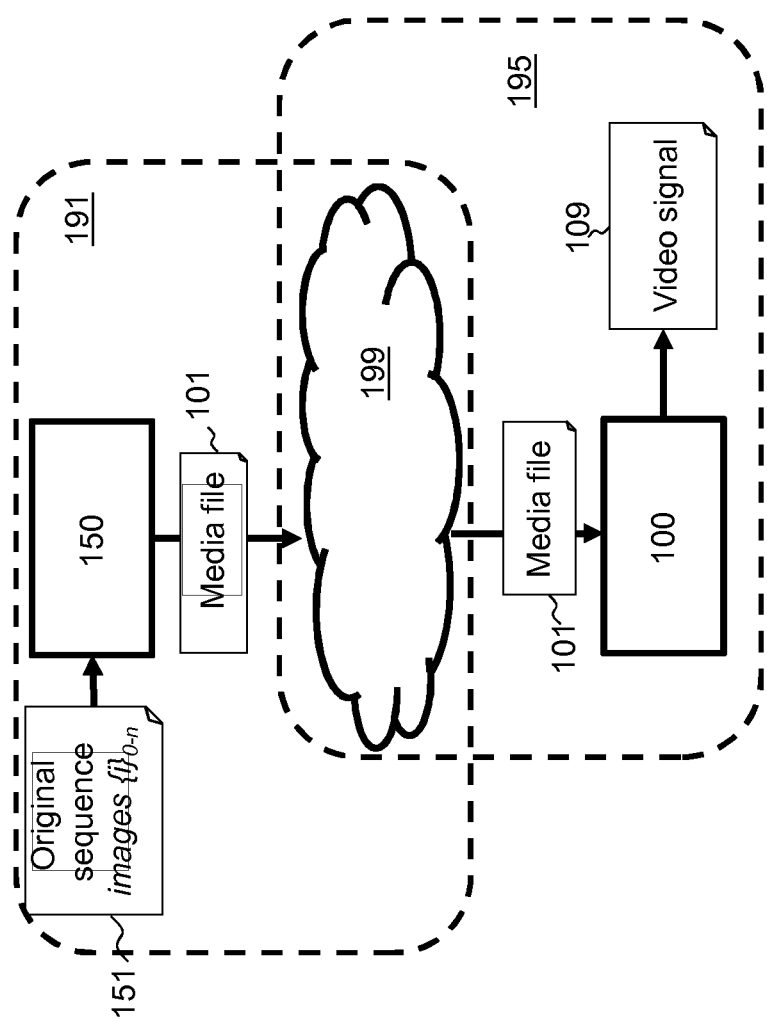
FIG. 1 illustrates exemplary systems comprising encapsulation/de-encapsulation modules adapted to embody embodiments of the present invention.

FIG. 1 illustrates exemplary systems 191 and 195 adapted to embody embodiments of the present invention. The system 191 comprises an encapsulation module 150 connected to a communication network 199. The system 195 comprises a de-encapsulation module 100 connected to the communication network 199.

According to an embodiment, the system 191 is for processing a content, e.g. video and/or audio content, for streaming or storage. The system 191 obtains/receives a content comprising an original sequence of images 151, encodes the sequence of images using a media encoder (e.g. video encoder) into media data (i.e. bitstream), and encapsulates the media data in a media file 101 using the encapsulation module 150. The encapsulation module 150 comprises at least one of a writer or a packager to encapsulate the media data. The media encoder may be implemented within the encapsulation module 150 to encode the received content, or it may be separate from the encapsulation module 150. The encapsulation module 150 can thus be dedicated only for encapsulating already encoded content (media data).

According to an embodiment, the system 195 is for processing media data for displaying/outputting to a user. The system 195 obtains/receives a media file 101 via the communication network 199, de-encapsulates the media file 101 to retrieve media data using a de-encapsulation module 100, and decodes the media data into an audio and/or video content (signal) using a media decoder. The de-encapsulation module 100 comprises at least one of a parser or player. The media decoder may be implemented within the de-encapsulation module 100 to decode the media data (bitstream), or it may be separate from the de-encapsulation module 100.

The media file 101 is communicated to the parser or player of module 100 in a number of ways, for example it may be generated in advance by the writer or packager of encapsulation module 150 and stored as data in a storage apparatus in the communication network 199 (e.g. on a server or a cloud storage) until a user requests the content encoded therein from the storage apparatus. Upon requesting the content, the data is communicated/streamed to the de-encapsulation module 100 from the storage apparatus.

The system 191 may also comprise a content providing apparatus for providing/streaming to the user content information for the content stored in the storage apparatus (e.g. the title of the content and other meta/storage location data for identifying, selecting and requesting the content). The content providing apparatus may also be adapted for receiving and processing a user request for a content to be delivered/streamed from the storage apparatus to the user terminal.

Alternatively, the encapsulation module 150 may generate the media file 101 and communicates/streams it directly to the de-encapsulation module 100 as and when the user requests the content. The de-encapsulation module 100 then receives the media file 101 and performs the de-encapsulating and the decoding of media data according to embodiments of the invention to obtain/generate a video signal 109 and/or audio signal, which is then used by a user terminal to provide the requested content to the user.

The user has access to the audio/video content (signal) through a user interface of a user terminal comprising the module 100 or a user terminal that has means to communicate with the module 100. Such a user terminal may be a computer, a mobile phone, a tablet or any other type of device capable of providing/displaying the content to the user.

According to one implementation, the media file 101 encapsulates media data (e.g. encoded audio or video) into boxes according to ISO Base Media File Format (ISOBMFF, ISO/IEC 14496-12 and ISO/IEC 14496-15 standards). The media file 101 may correspond to one media file (indicated by a FileTypeBox 'ftyp') or one or more segment files (indicated by a SegmentTypeBox 'styp'). According to ISOBMFF, the media file 101 may include two kinds of boxes; a "media data box" 'mdat' containing the media data and "metadata boxes" containing the metadata defining placement and timing of the media data.

A video encoder encodes video content using a video standard to generate an encoded video bitstream (media data). Video coding/decoding (codecs) standards include ITU-T H.261, ISO/IEC MPEG-1 Visual, ITU-T H.262 (ISO/IEC MPEG-2 Visual), ITU-T H.263 (ISO/IEC MPEG-4 Visual), ITU-T H.264 (ISO/IEC MPEG-4 AVC), including its scalable video coding (SVC) and multi-view video coding (MVC) extensions, ITU-T H.265 (HEVC), including its scalable (SHVC) and multi-view (MV-HEVC) extensions.

Many embodiments described herein describe examples using the HEVC standard, or extensions thereof. However, the techniques and systems described herein may also be applicable to other coding standards already available, such as AVC, or not yet available or developed, such as ITU-T H.266 (VVC) that is under specification.

Figure 2A:
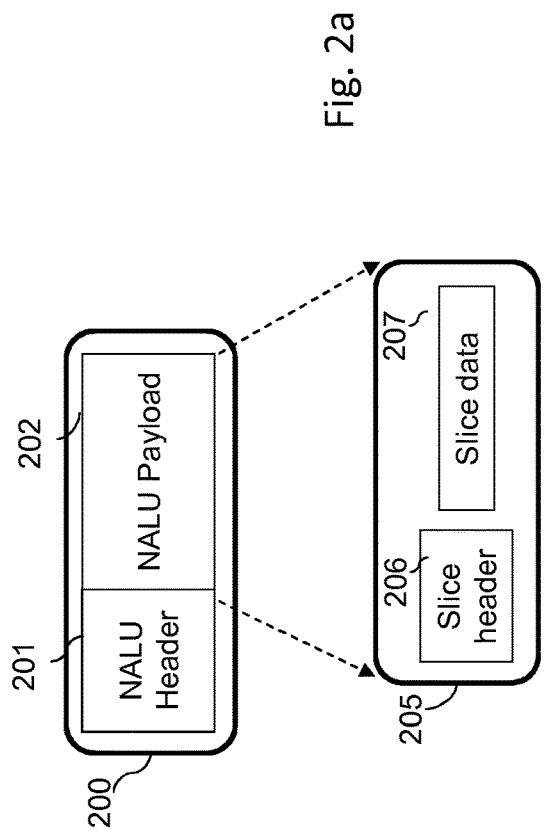
FIG. 2a illustrates structure example of a NAL (Network Abstraction Layer) Unit.

FIG. 2a illustrates structure example of a NAL (Network Abstraction Layer) Unit 200 used in video codecs such as H.264/AVC or HEVC/H.265.

A NAL unit contains a NAL unit header 201 and a NAL unit payload 202. The NAL unit header 201 has a fixed length and provides general information on the NAL unit. For example, in HEVC, the NAL Unit header 201 indicates a type, an identifier of a layer and an identifier of a temporal sub-layer for each NAL unit. There are two main types of NAL units 200: Video Coding Layer NAL units (VCL-NAL) and Non-VCL NAL units. A VCL NAL unit typically contains in its payload a coded slice segment 205. A Non-VCL NAL unit typically contains parameter sets (i.e. configuration information) or Supplemental Enhancement Information messages.

A coded slice segment 205 is encoded in the HEVC bitstream as a slice_segment_header or "slice header" 206 followed by slice_segment_data or "slice data" 207. A slice segment contains an integer number of consecutive (in raster scan order) Coding Tree Units (i.e. blocks in a picture). The slice does not necessarily have a rectangular shape (it is thus less appropriate than tiles for spatial sub-part representations). Video compression formats define an access unit as a set of NAL units, consecutive in decoding order, corresponding to a coded picture.

Figure 2B:
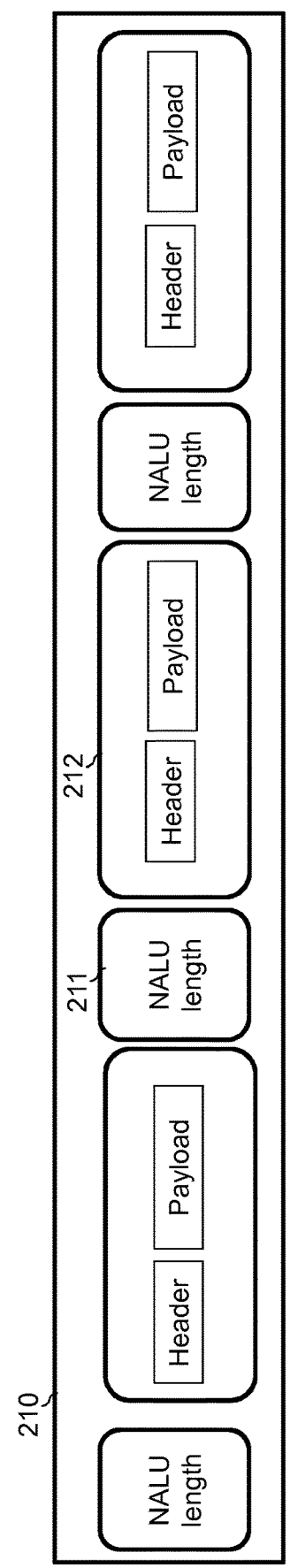
FIG. 2b illustrates structure example of a video media sample according to ISO Base Media File Format.

FIG. 2b illustrates structure example of a media (video) sample 210 according to ISO Base Media File Format.

A media sample is an audio/video data unit with a single time (e.g. an audio or a video frame). According to ISO/IEC 14496-15, a sample is a set of one or more NAL units 212 corresponding to an access unit or to a part of an access unit. Each NAL unit 212 is preceded by a NAL unit length field 211. For example, for single layer video, a sample corresponds to a coded picture. For layered video, a sample may correspond to a part of an access unit, for example to the NAL units for the base layer.

The sample size, in terms of bytes, is described in the sample size box 'stsz' or 'stsz2'. Given the sample size and the NAL unit length, an ISOBMFF parser (e.g. module 100) can determine the number of NAL units in a sample. ISO/IEC 14496-15 defines specific NAL units, Extractors and Aggregators that are ISOBMFF structures embedded within the media data ('mdat' box). They are also called "in-stream structure".

Figure 3:
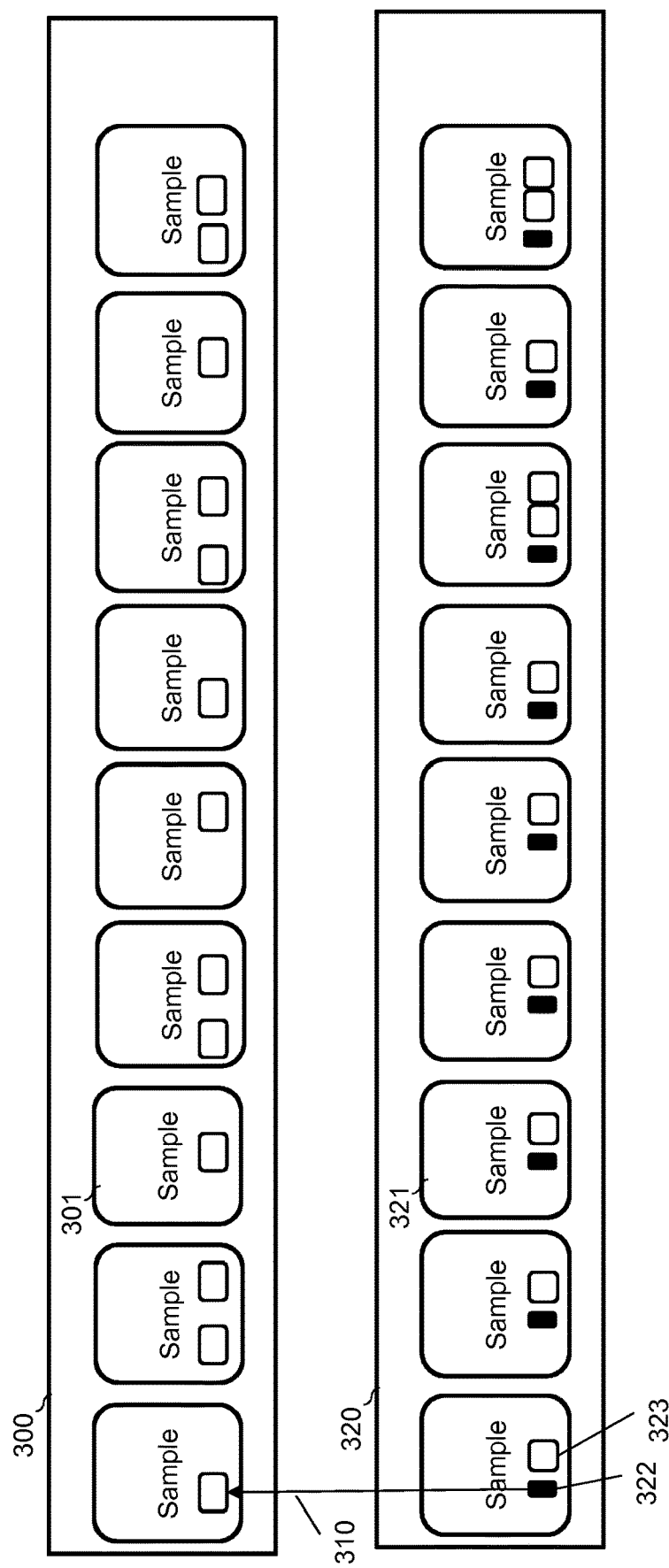
FIG. 3 illustrates an example Extractor and Aggregator structures according to ISO/IEC 14496-15.

FIG. 3 illustrates an example Extractor and Aggregator structures according to ISO/IEC 14496-15.

A first (media) track 300 corresponding to a media stream (e.g. a compressed video bitstream) comprises media (e.g. video) samples 301, each media sample containing a set of one or more NAL units, as illustrated in FIG. 2b. The number of NAL units in a sample may vary from one to another. A second track 320, called for example reconstruction, composition, reference or extractor track, comprises samples 321 mixing NAL units 323 and Extractor NAL units 322 to reference data from another track, here the first track 300 as illustrated by the arrow 310. A sample 321 from current track 320 may then be reconstructed by extracting data from track 300 and concatenating it with data 323 from current track 320.

Note that some samples 321 of the reconstruction track 320 may contain only Extractors or only data. The number of Extractors or NAL units may vary from one sample 321 to another. The Extractor 322 is a structure that enables efficient extraction of NAL units from tracks other than the one containing the extractor. The Extractor NAL unit is identified by a specific NAL unit type value (the specific value may depend on the codec in use in order not to conflict with type values assigned to VLC and non-VLC NAL units).

The ISO/IEC 14496-15 defines Extractor for different compression formats: SVC, MVC, HEVC . . . . For HEVC, Extractors introduce specific constructors to reconstruct a sample from data in a referenced track (SampleConstructor) or from data directly provided within the constructor (InlineConstructor). Existing Extractors and Constructors specify the data extraction or copy as a copy of a number of bytes from a given byte position.

This invention proposes to rather specify the data extraction or copy in Extractor or Constructor in terms of syntax structure rather than in terms of byte ranges. One advantage is that copying syntax structures allows to secure the byte alignment in the bitstreams. Another advantage is that we can reduce the description size of an Extractor. This is valuable since Extractors are defined at sample level, then repeated over time. Another advantage is that it allows extraction from alternative or group of tracks. The latter is not possible when expressing the extraction operation in byte ranges, because from one track to another the byte positions may not correspond to the same syntax structure. Yet another advantage is that writer or packager does not have to care about the length in bytes of the NALUnitLength field of the NAL units to compute and provide the number of bits for data offset and data length fields in the Extractor or the SampleConstructor. With existing Extractors or SampleConstructors, writer or packager may have to reformat the extracted data to conform to the destination track's length field size.

Figure 4B:
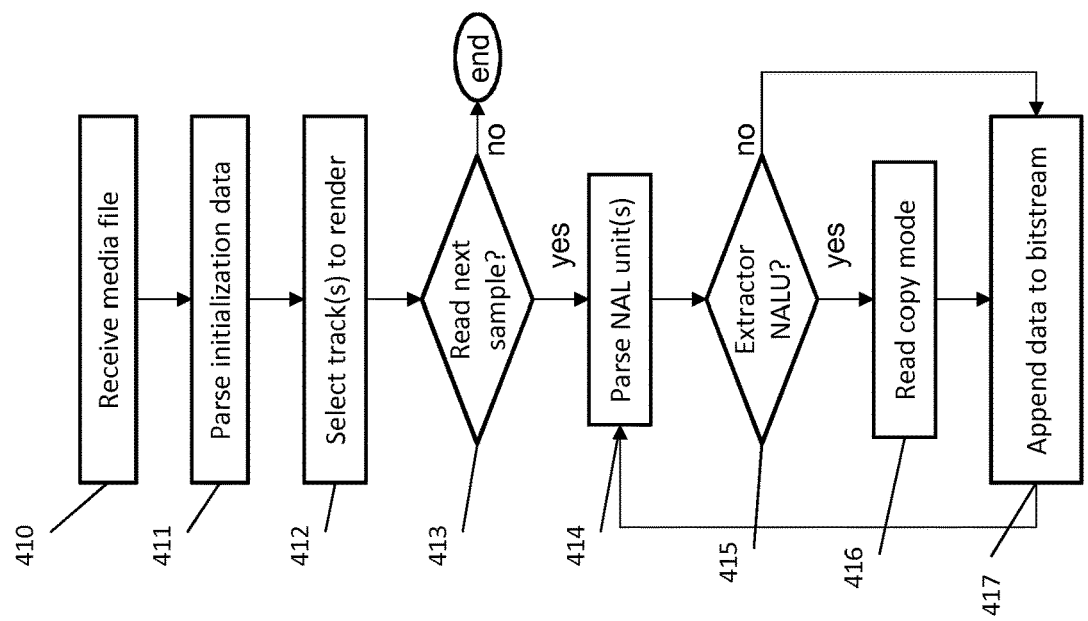
FIGS. 4a and 4b illustrate the encapsulation and de-encapsulation processes according to embodiments of the invention.
Figure 4A:
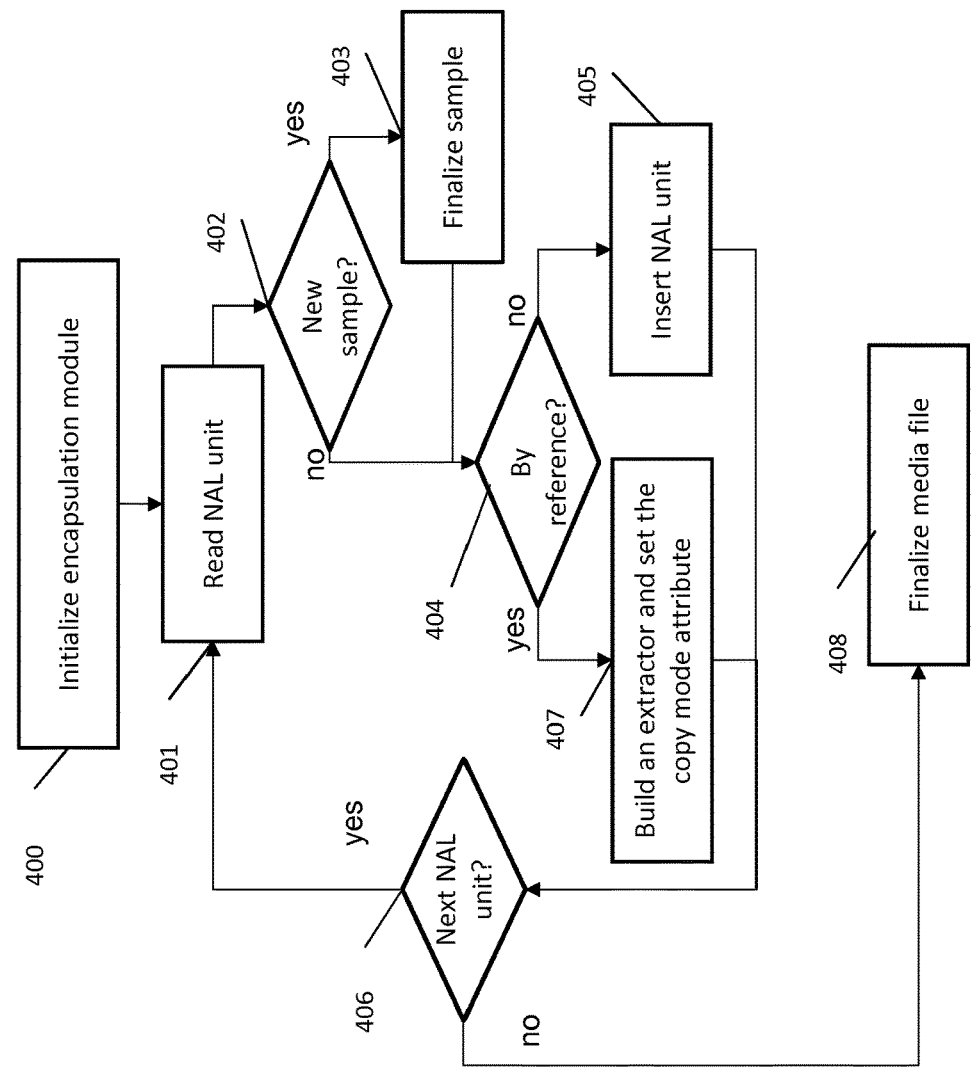

FIG. 4a illustrates the encapsulation process according to an embodiment of the invention. In an implementation, the process is performed by the writer or the packager of encapsulation module 150 illustrated in FIG. 1 for encapsulating media data.

At step 400, the encapsulation module is initialized in order to be able to read properly the media data (bitstream). The initialization may be performed by a user through a user interface or by an application. The initialization may concern identifying the syntax structures of the bitstream (referred to as data entities for generality) and configuring the encapsulation parameters. The configuring of the encapsulation may consist in deciding for example, whether to generate the media file 101 as one media file, or a plurality of media segments; whether to include in the media file one track or multiple tracks for the video stream; setting the splitting of video tracks into parts, views or layers, etc.

In case of multiple tracks are included, the encapsulation module may set, during step 400, reference between tracks or define group of tracks. Thus, a track that is built by reference to one or more other tracks contains track references to these one or more tracks. A track reference may be of different types to describe the kind of relationship or dependency between the referencing track and the referenced track. The track reference type may be encoded using a four-character code. For example, according to ISO/IEC 14496-15, a type code 'scal' designates a track containing an extractor referencing another track from which data is extracted.

Once encapsulation module is initialized, the bitstream is read at step 401, NAL unit by NAL unit. The first NAL units, corresponding to parameter sets may be embedded in a DecoderConfigurationRecord structure, depending on the initialization at step 400 (in-band or out of band parameter sets). These parameter sets may be inspected by the writer or packager to know more about the bitstream partition. For example, it can determine whether it is a tiled HEVC bitstream, for example by checking SEI (Supplemental Enhancement Information) messages for Temporal Motion-Constrained Tile Sets or tile presence in the Picture Parameter Set. When a NAL unit is read at step 401, the writer checks at step 402 whether it corresponds to a new sample or not. This can be done for example by decoding the picture order count or by checking whether the slice corresponding to the NAL unit is the first slice in picture. If yes, the previous sample is finalized in step 403 by setting parameters of the sample description (size, position in the media data, properties in some sample groups . . . ). In particular, it resets the sample size to 0, a NAL unit count to 0. Then, it checks at step 404 whether the current NAL unit should be included in the media part of a track or should be referenced from another track, or should be partly modified and referenced. This is determined from the track dependencies or relationships set up during the initialization step 400. If the NAL unit is not referenced, the length of the NAL unit is first inserted in the media data 'mdat' box, followed by the NAL Unit header and payload (step 405). The size of the current sample is then incremented with the number of bytes for these three structures and the writer or packager checks for the next NAL unit from the video bitstream at step 406. If this is not the last NAL unit, the process iterates to step 401 until all NAL units are processed.

If a NAL unit is to be included in the media file by reference (test 404 true), the writer or packager includes, at step 407, an extractor and sets the attributes of the extractor according embodiments of the invention. In particular, the process appends a NAL unit length field with the size of an Extractor structure in bytes in the 'mdat' box, and creates an Extractor NAL unit. The Extractor includes a copy mode attribute 'copy_mode' that identifies, in the media sample, the referenced data entity relatively to one or more NAL units contained in the media sample. The copy mode attribute may take different values depending on how the writer or packager has been initialized at step 400.

In one implementation, if the initialization performed at step 400 results in that the reconstruction track is used to compose video samples from different tracks, then the copy mode attribute is set to 'sample' mode. In this mode, the data entity comprises all the set of NAL units contained in the sample.

In one implementation, if the initialization performed at step 400 or bitstream inspection indicates that the video bitstream is tiled (e.g. HEVC with Motion constrained tile set), and the user or application indicated tile rearrangement, then the copy mode attribute is set to 'NALU' mode. In this mode, the data entity comprises one given NAL unit contained in the sample.

In one implementation, if the initialization performed at step 400 results in that the tile rearrangement requires modification of the tile positions in the bitstream, then writer may provide the rewriting instruction with an inline constructor plus an Extractor with the copy mode attribute set to 'slice_data' mode or to 'NALU_payload' mode depending on whether the tile position is encoded in the slice header or in the NAL unit header. In these modes, the data entity comprises the payload or slice data of one given NAL unit contained in the sample. These modes are advantageous because they avoid copying useless data that would be overwritten by the instructions of the inline constructor.

When the extractor is written in the media data part ('mdat' box), the sample description is updated (sample size, current NALU index in the sample, etc.). The writer or packager then checks for the next NAL unit at step 406. When the last NAL unit is reached, the writer terminates the media file at step 408, for example by writing the size of the last sample, index tables, user data or any metadata on the media.

Note that when the initialization step 400 indicates an encapsulation into segments, an additional test is performed (not represented) before starting a new sample to check whether the segment duration is reached or not. When segment duration is reached, the segment is finalized and is ready to be used by a player or to be sent over a distribution network. When segment duration is not reached, the writer or packager iterates on samples and NAL units.

FIG. 4b illustrates the de-encapsulation process according to an embodiment of the invention. In an implementation, the process is performed by the parser or the player of de-encapsulation module 100 illustrated in FIG. 1 for de-encapsulating media data.

At step 410, the player first receives a media file 101 (as one file or as consecutive segments). The file may be stored in memory of the parser or player, or may be read from a network socket.

First, the initialization data, typically the 'moov' box and its sub-boxes are parsed at step 411 to know the parameters/settings of the media file: number of tracks, track relationships and dependencies, type of samples, durations, positions and sizes, etc.

From the set of tracks determined at step 411, the player or parser selects at step 412 one or more tracks to be rendered. Then, the reconstruction begins by parsing the media data box sample by sample. For inter dependent tracks, the parsing of the media data is done according to track reference from the referenced track to the referencing track using the sample position information, for example from the sample to chunk box 'stsc' and chunk offset box 'stco' available in the sample table box.

The parser or player iterates over samples until the end of the file is reached (test 413 negative). In case of segments, when one segment is fully read, the parser reads the next segment, sample by sample.

For a given sample, the process reads data from the position indicated by the chunk offset box plus the cumulated sizes of previous samples parsed for this chunk. From this position, the parser finds a NAL unit length field. The parser then reads the number of bytes given by the NAL unit length field to get the NAL unit payload. If the NAL unit corresponds to an Extractor (test 415), the parser reads at step 416 the copy mode attribute of the Extractor. If the NAL unit is not an Extractor, the parser appends at step 417 the bytes corresponding to the NAL unit payload to the reconstructed bitstream (media data) that will be provided to the media decoder for decoding. After step 417, the process iterates on the next NAL unit (go to step 414) until the size of the current sample is reached.

Depending on the value of the copy mode attribute, the parser extracts a sample, a NAL unit, a NAL unit payload or slice data from the referenced track. Indeed, according to embodiments of the invention, the copy mode attribute indicates a syntax structure or data entity to copy (instead of byte ranges). For example, the copy mode may indicate to copy a sample or an access unit, a NAL unit, a NAL unit payload or a slice data.

In the following, examples are provided to illustrate the new Extractor proposed according to embodiments of the invention. The new Extractor implements a copy mode attribute as discussed above in steps 407 and 415 of the encapsulation/de-encapsulation processes of FIGS. 4*a* and 4*b*.

The implementation of the copy mode attribute is applicable for both Extractors without constructors such as SVC, MVC Extractors, and Extractors with Constructors, such as HEVC or L-HEVC Extractors. For Extractors with constructors, a new kind of Constructor may be defined as follows (identified by a "constructor_type"):

```
class aligned(8) Extractor ( ) {
    NALUnitHeader( );
    do {
        unsigned int(8) constructor_type;
        if( constructor_type == 0 )
            SampleConstructor( );
        else if( constructor_type == 2 )
            InlineConstructor( );
        else if ( constructor_type == 3 )
            SampleConstructorFromStructure( );
    } while( !EndOfNALUnit( ) )
}
```

The name of the new Constructor 'SampleConstructorFromStructure' is provided as an example. Furthermore, the reserved 'constructor_type' value '3' is provided as an example. The new Constructor instead of indicating ('SampleConstructor') or providing ('InlineConstructor') byte ranges, indicates a copy mode relying on syntax structures. Any reserved name or reserved value for 'constructor_type' may be used. The new Constructor is defined as illustrated below. In a preferred embodiment, the new Constructor performs extraction from time-aligned samples in the referenced track. This avoids repeating the 8 bits for the "sample_offset" in each sample using Extractor(s) NAL units:

```
class aligned(8) SampleConstructorFromStructure ( ) {
    unsigned int(8) ref_index;
    unsigned int(2) copy_mode;
    if (copy_mode != 0) {
        unsigned int(1) nalu_idc_field_size;
        unsigned int(5) reserved;
        unsigned int((nalu_idc_field_size+1)*8) nalu_idc;
    } else {
        unsigned int(6) reserved;
    }
}
```

Where the parameters, fields or attributes of the new Constructor have the following semantics:

"ref_index" specifies the index of the track reference of type 'scal' to use to find the track_ID from which to extract data. It is to be noted that an amendment of ISOBMFF allows track reference to reference tracks or track groups. When the ref_index resolves to a track_group_id, it is up to the parser or player to select the most appropriate track in the corresponding track group depending on the track grouping_type. A default behavior may be to select the first track in the file having the specified track_group_id;

"copy_mode" specifies the copy operation (i.e. a copy mode) to be performed when resolving the extractor. One or more of the following values are for example chosen:

"0" for signaling a 'sample' mode, i.e. copy from the first byte of the sample until the end of the sample, inclusive. The first byte of the sample can be determined from the Sample to Chunk Box and Chunk Offset Box;

"1" for signaling a 'NALU' mode, i.e. a copy from the first byte of the i-th NAL Unit to the last byte of this same NAL Unit, where i corresponds to the nalu_idc field. The length of bytes to copy, corresponding to a NAL unit is determined from the length field 211 preceding a NAL Unit 212 in the media data box 'mdat';

"2" for signalling a 'NALU_payload' mode, i.e. a copy from the first byte in the i-th NAL Unit payload to the last byte of this same NAL Unit, where i corresponds to the nalu_idc field;

"3" for signalling 'slice_data' mode, i.e. a copy from the first byte of the i-th slice_data to the last byte of this same slice, where i corresponds to the nalu_idc field. A parser or reader determines the position of the first byte to copy, for example by reading an ISOBMFF structure dedicated to the description of the slice header length. This may be indicated by a dedicated sample group providing the slice header length for the samples or by an in-stream structure providing for each NAL unit the length of the slice header;

'nalu_idc_field_size': this field indicates the number of bytes minus one used to encode the nalu_idc parameter; and nalu_idc: when copy_mode is NALU-based (copy_mode !=0), this field provides the index (1-based index) of the NALU from where to extract. Value 0 is reserved.

It is to be noted that the last two copy modes ('NALU_payload' and 'slice_data' modes) are useful when some header rewriting is performed (NAL unit header or slice header). In such case, only payload needs to be extracted and combined with the rewritten header. The rewriting of the header may be handled by an InlineConstructor.

In case the Extractor references an Aggregator, the offset of the first byte to copy is computed by adding the NAL unit length field value augmented by the NAL unit length field size and additional_bytes field in the case of Aggregators of the nalu_idc-1 NAL units. While the Aggregator has some interest for the sample copy mode, it is recommended to avoid Aggregators when extracting at NAL unit or slice level. When present with a copy_mode set to NAL unit or slice based copy, the Aggregator shall be ignored and the i-th NAL unit as indicated by the nalu_idc parameter is processed.

In all the above copy modes, the data entity to be copied is easily determined relatively to the one or more NAL units contained in the sample, either when a whole NAL unit is copied or when part (payload/slice) of a NAL unit is copied.

From the above definition, we can see that the new Constructor costs between 2 to 4 bytes, depending on the copy mode while the existing "SampleConstructor" costs between 4 to 10 bytes depending on the NAL unit length (the "lengthSizeMinusOne" field in the DecoderConfigurationInformation). A copy mode set to "sample" mode will reduce the size of the Constructor by at least a factor of 2.

The above list of copy modes is not exhaustive and other copy modes can be envisaged that save more bytes. For example, according to one implementation, the copy mode attribute may be set to 'First_NALU' mode which signals to the parser to copy the first NAL unit of the current sample. In this mode, it is no longer necessary to provide the 'nalu_idc' parameter. One or two additional bytes can thus be saved. According to another implementation, the copy mode may target a range of NAL units. For example, copy_mode is set to 'NALU_range' mode where a start NAL unit index and end NAL unit index are expected as parameters.

Considering the reserved bits, up to 128 copy modes may be defined. There shall be one reserved value for each copy mode for parsers to unambiguously identify the copy mode set by a writer or packager in the media file. When more flexibility is needed for the extraction, in particular extraction from non time-aligned samples, the new Constructor may embed a sample_offset parameter in addition to the copy_mode parameter or attribute.

In an alternative embodiment, a new Extractor is defined, with a reserved NAL Unit type to distinguish the new Extractor operating on syntax structure-based copy mode from existing byte-based Extractor. The new Extractor, called for example "StructureExtractor" is defined as follows:

```
class aligned(8) StructureExtractor ( ) {
    NALUnitHeader( );
    unsigned    int(8) ref_index;
    signed      int(8) sample_offset;
    unsigned    int(2) copy_mode;
    if (copy_mode !=0 ) { // 0: sample copy mode
        unsigned int(1) nalu_idc_field_size;
        unsigned int(5) reserved;
        unsigned int((nalu_idc_field_size+1)*8) nalu_idc;
    } else {
        unsigned int(6) reserved;
    }
}
``` with the same semantics as for the new Constructor disclosed above. The main difference is that here we have a specific 'NALUnitHeader'. 'NALUnitHeader' is a NAL Unit header corresponding to the video coding format in use but with a reserved value that is not already reserved for any VCL, non-VCL NAL unit of the video coding format in use or existing Extractor or Aggregator.

In an alternative embodiment, the new Extractor always operates on time-aligned samples, so that the 'sample_offset' parameter is not present in the new Extractor structure. The two new Extractors (time-aligned or non-time aligned) can be distinguished by different specific values of their nalu_type (in the NAL Unit header).

In an alternative embodiment, use is made of one of the reserved bits as a flag indicating the presence or absence of the sample offset; this allows time aligned or non time aligned extraction with a single Extractor or Constructor. When the flag is set, sample_offset is present and has the same semantics as for existing Extractors or Constructors and allows non-timed aligned extraction. When the flag is not set, sample_offset is not present and only time-aligned extraction is allowed. An example is provided below. Similar embodiment can be applied to the Extractors providing a copy_mode.

```
class aligned(8) SampleConstructorFromTrackGroup ( ) {
    unsigned int(8) ref_index; // an identifier for a group of tracks
    unsigned int(2) copy_mode; // sample, NALU, NALU payload, slice data
    unsigned int(1) time_aligned_extraction;
    if (time_aligned_extraction == 1) {
        signed int(8) sample_offset;
    }
if (copy_mode != 0) {
unsigned int(1) nalu_idc_field_size;
    unsigned int(4) reserved;
unsigned int((nalu_idc_field_size + 1) * 8) nalu_idc;
} else {
    unsigned int(5) reserved;
    }
}
```

According to a preferred embodiment, the new defined Extractors or Constructors can be advantageously used in media files encapsulating multiple tracks, such as groups, alternatives or equivalents, as it is described hereinafter.

An ISOBMFF file may encapsulate multiple encoded bitstreams or subparts of bitstreams resulting in multiple tracks. For example, an ISOBMFF file may contain several tracks, each representing a video sequence at a given quality, resolution or bitrate and encapsulated in a same media file to provide a choice for the player. ISOBMFF and its extensions comprise several grouping mechanisms to group together tracks, static items, or samples. A group typically shares common semantic and/or characteristics. ISOBMFF also defines tools to describe relationships between tracks.

For instance, ISOBMFF comprises an entity group mechanism and a track group mechanism. The entity grouping mechanism can be used to indicate that tracks and/or static items are grouped according to an indicated grouping type or semantic. The track grouping mechanism can be used to indicate that tracks are grouped according to an indicated grouping type or semantic. For track groups, as a first tool, ISOBMFF provides a box denoted 'trgr' located at track level (i.e. within the 'trak' box in ISOBMFF box hierarchy) to describe groups of tracks, where each group shares a particular characteristic or where the tracks within a group have a particular relationship. A track group at least contains an identifier ("track_group_id") and a grouping_type ("track_group_type"). All the tracks having a track group box with a 'TrackGroupTypeBox' having the same track_group_type and track_group_id values are part of the same track group. The Omnidirectional Media Application Format (OMAF, ISO/IEC 23091-2) is considering a new grouping type 'alte' to indicate that tracks within this type of track group are alternatives to be used as a source for 'scal' or 'sabt' track references. They also extend the semantics of the track reference type to reference both tracks or track groups in the 'tref' box. This last point may impact the Extractor resolution by media parser or player.

A second tool to define group of tracks and in particular alternate group of tracks is the 'alternate_group' parameter in the track header. This parameter provides an identifier, as an integer, that specifies a group or collection of tracks. Tracks sharing the same value for their 'alternate_group' parameter contain alternate data for one another. Accompanying the 'alternate_group' identifier and to distinguish tracks within an alternate group of tracks, a media file may contain attributes (for example: bitrate, frame rate, codec, language, packet size . . . ) that can be used as differentiating criteria.

A third tool is the 'EntityGrouping' that may group entities, i.e. items or tracks (or both). As for track groups, an 'EntityToGroup' contains an identifier and a 'grouping_type'. In particular, ISO/IEC 14496-12 declares a grouping_type 'altr' to group alternatives to each other.

Another tool to describe relationships between tracks is the track reference mechanism. It consists in a TrackReferenceBox 'tref' declared at track level containing one or more TrackReferenceTypeBox that each provides the type of the reference and the identifier (track_ID) of one or more referenced tracks. This mechanism is for example used to indicate that a set of tracks share a same "base track" in layered or scalable video ('sbas') or tiled video ('tbas'). Alternative or equivalent tracks, instead of using the track group mechanism, may be signaled via the track reference mechanism with a specific track reference type. For example, the 'eqiv' track reference type indicates that the referencing track and the referenced track(s) can be transparently used for extraction, i.e. they represent the same visual content, the corresponding bitstreams can be combined (they have the same parameter sets). There may be other signaling to indicate that a set of tracks are equivalent. As soon as such signaling allows to uniquely identifying a set or group of tracks it can be used by the new Extractor or Constructor from track group.

Figure 5:
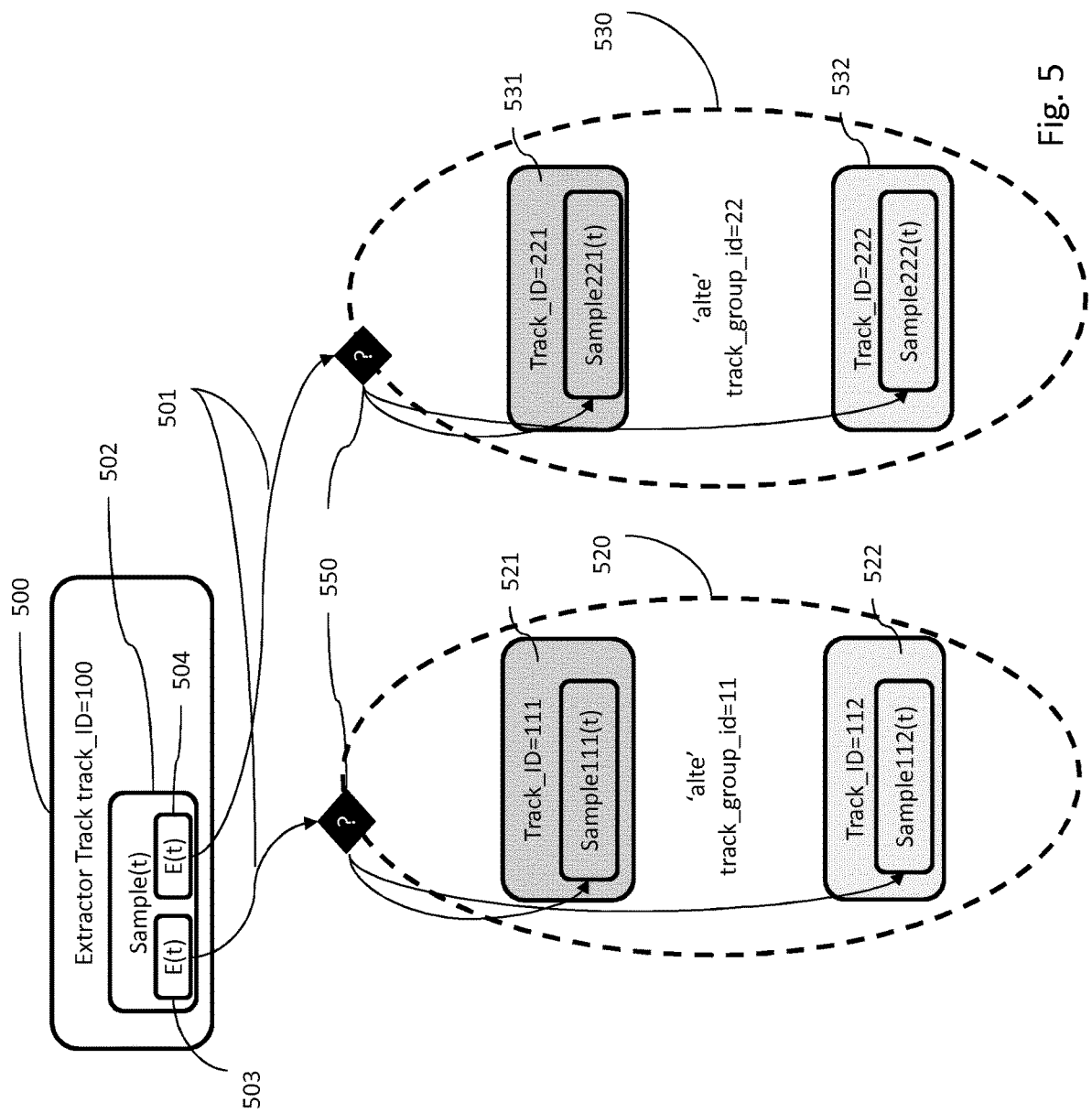
FIG. 5 illustrates an example of encapsulation of media data with extraction of data from a group of tracks according to embodiments of the invention.

FIG. 5 illustrates an example of encapsulation of media data with extraction of data from a group of tracks according to embodiments of the invention.

An extractor track 500 (track_ID=100) has track references 501 of type 'scal' to two track groups 520 and 530 (with respectively track_group_id=11 and 22). These two track groups may have their track_group_type set to 'alte' signaling that their tracks are alternatives to each other, or any other grouping type with a semantic for which it is always possible to make a decision for selecting only one track from the track group. In this example, each of these track groups declares two alternative tracks 521, 522 and 531, 532 (respectively tracks with track_ID=111 and 112 and tracks with track_ID=221 and 222). For example, the tracks inside a track group describe the same video but encoded at different quality levels. In this example, a sample at time 502 t in the Extractor track 500 consists in the concatenation of a sample at time t from one track in the first track group 520 with a sample at time t from one track in the second track group 530. For each track group 520 or 530, a writer 150 indicates that the Extractor 503 in sample 502 may extract the samples from any one of the alternative tracks inside the track group 520 and the Extractor 504 in sample 502 may extract the samples from any one of the alternative tracks inside the track group 530. The Extractors 503 and 504 have their copy_mode set to a value corresponding to "sample" copy mode.

The resolution of such Extractor from track group requires an additional step by parser or player like 100 (represented by 550). When identifying an Extractor NAL Unit in step 415 (FIG. 4b), the parser has to check whether the ref_index corresponds to a track_ID or to a track_group_id. This can be determined by the brand of the file, by the type of the Extractor or Constructor when the Constructor or Extractor from track group only takes track_group_id as ref_index. When Constructor or Extractor from track group accepts both track_ID and track_group_id, the parser maintains a list of IDs with an indication of it relates to a track or to a track group. From this list, the parser determines whether the ref_index of the Extractor or Constructor from track group directly resolves to a track_ID or to a track_group_id. When the ref_index resolves to a track_group_id, it is up to the parser or player to select the most appropriate track in the corresponding track group depending on the track grouping_type. A default behavior is to select the first track in the file having the specified track_group_id. Another behavior is to check in track selection box or any other track description what parameter differentiate the alternative tracks, and according to the application or context (bandwidth, processing capabilities) to select the most appropriate track in the track group.

To avoid decoding artefacts, the parser may reevaluate the selection of the track in the referenced track group only on random access samples (e.g. Intra frame for video). The parser may determine the positions of the random access samples by inspecting the 'rap' sample group of the alternative tracks. In a preferred embodiment, the bitstreams corresponding to the alternative tracks have their random access points aligned, so that the parser knows, only by looking at one track sample group when to reevaluate the track selection for extraction.

The alignment or not of the random access points for the alternative tracks may be signaled by a specific 'track_group_type' or track reference type or any signaling describing the equivalence of tracks. The new Constructor or Extractor referencing track groups may also embed one parameter (for example a flag coded on 1 bit, reusing reserved bits) that indicates whether the tracks within the track group have their random access points aligned or not. When aligned, a parser knows the samples on which it can reevaluate the selection of a track within the track group. When this new parameter is set to false, it means that the random access points are not aligned across the tracks within the track group. Then, before reevaluating the selection of one track when resolving an Extractor or Constructor referencing a track group, a parser first has to check that at least one track within the referenced track group has a random access point for the current sample (the one containing the Extractor).

An alternative embodiment allows to avoid the above check. In this alternative embodiment, the Extractor or Constructor referencing a track group has an optional parameter, combined with the flag or parameter indicating the alignment or not of random access points across tracks. When the flag is set to false, the new optional parameter is present and provides the list of tracks within the referenced track group that have a random access point for the current sample (the one containing the Extractor). The list of tracks is described as a list of track_IDs. From this list, a parser determines for a given sample the list of possible candidate tracks within the track group from which to extract.

According to the alternative embodiment the Extractor is specified as follows:

```
class aligned(8) StructureExtractor ( ) {
    NALUnitHeader( );
    unsigned    int(8) ref_index;
    signed      int(8) sample_offset;
    unsigned    int(1) aligned_RAPs
    if (aligned RAPs == 0) {
        unsigned int (8) switchable_tracks;
    }
    unsigned int(2) copy_mode;
    if (copy_mode !=0 ) { // 0: sample copy mode
        unsigned int(1) nalu_idc_field_size;
        unsigned int(4) reserved;
        unsigned int((nalu_idc_field_size+1)*8) nalu_idc;
    } else {
        unsigned int(5) reserved;
    }
}
```

As for previous embodiments, the 'StructureExtractor' may have two version a time-aligned one where 'sample_offset' is not present and a non time-aligned one where sample_offset is present (as in the above structure). Each version has a specific NAL Unit type so that a parser can easily identify the kind of Extractor. The parameter called "aligned_RAPs" (name is just an example) corresponds to the flag indicating that the tracks within the referenced track group (via the ref_index) have aligned random access points or not. The parameter called 'switchable_tracks' (name is just an example) is a parameter providing the list of switchable tracks for Extractor resolution. It contains the indices of tracks within the track group providing a random access point for the given sample. A writer or packager 150 sets this list at step 407, depending on initialization information obtained in step 400 like indications on how to group tracks, described in 'trgr' boxes for example.

It is to be noted here that this parameter could be an array of track_IDs, but for description efficiency, we declare instead of a list track_IDs (32 bits each) the index of the track within the track group (8 bits each). It is a 1-based index. The index is determined as follows (on both writer and parser sides): for each track group, an ordered list of track_IDs is stored in memory. The order is in increasing value of track_IDs. For example, if tracks with track_IDs 1, 12, 23 are part of a same track group, the index 1 provides track_ID=1, index 2 provides track_ID 12, etc. . . . . This also works when the equivalence of tracks are signalled via a specific track reference type. The index is also based on an ordered list of track_IDs referenced by the specific track reference type. There are scenarios where placing random access points (e.g. Intra Decoding Refresh—IDR—frames) at different times for alternative tracks offer more switching points for dynamic content adaptation and can reduce the switching latency.

Of course, the same parameters may apply to a new Constructor referencing track groups (here for a time aligned version of the Constructor, i.e. without the sample_offset parameter):

```
class aligned(8) SampleConstructorFromStructure ( ) {
    unsigned int(8) ref_index;
    unsigned int(2) copy_mode;
```

-continued

```
    unsigned int(1) aligned_RAPs
    if (aligned_RAPs == 0) {
        unsigned int (8) switchable_tracks;
    }
    if (copy_mode != 0) {
        unsigned int(1) nalu_idc_field_size;
        unsigned int(4) reserved;
        unsigned int((nalu_idc_field_size+1)*8) nalu_idc;
    } else {
        unsigned int(5) reserved;
    }
}
```

The new parameters 'aligned_RAPs' and optional 'switchable_tracks' have the same meaning as when used in the above StructureExtractor. The above name 'SampleConstructorFromStructure' is provided as an example, it may also be called 'SampleConstructorFromTrackGroup' or any name corresponding to a unique and reserved single constructor_type value.

For both Extractor or Constructor with a copy mode (generic case or referencing track groups), an alternative embodiment provides a different way of indicating the index of NAL units to extract (when copy_mode indicates a mode different than the "sample" copy mode.). This alternative embodiment leads to the following new definition of Extractor or Constructor.

For HEVC or L-HEVC Extractor, we propose a new type of constructor, called here for example SampleConstructorFromTrackGroup, that extends the HEVC and L-HEVC extractors (or any compression format reusing the concept of constructors inside an Extractor) with the possibility to reconstruct from a set or from a group of tracks as follows:

```
class aligned(8) Extractor ( ) {
    NALUnitHeader( );
    do {
        unsigned int(8) constructor_type;
        if( constructor_type == 0 )
            SampleConstructor( );
        else if( constructor_type == 2 )
            InlineConstructor( );
        else if ( constructor_type == 3
            SampleConstructorFromTrackGroup ( );
    } while( !EndOfNALUnit( ) )
}
```

The semantics of Extractor:constructor_type is updated as follows:

'constructor_type' specifies the constructor that follows. SampleConstructor, InlineConstructor and SampleConstructorFromTrackGroup correspond to constructor_type equal to 0, 2 and 3 respectively. Other values of constructor_type are reserved.

An example is given below for constructor_type equal to 3 (but any other not used value is acceptable):

```
class aligned(8) SampleConstructorFromTrackGroup ( ) {
    unsigned int(8) ref_index;
    unsigned int(2) copy_mode;
    unsigned int(6) reserved;
    if (copy_mode != 0) {
```

```
        unsigned int(8) nalu_idc; // 1-based index
        if (nalu_idc == 0){
            unsigned int(8) escape_nalu_idc; // To address from 255 to 511
        }
    }
}
```

With the following semantics:

ref_index specifies the index of the track reference of type 'scal' to use to find the track_group_id from which to extract data. It is up to the parser or player to select the most appropriate track in the corresponding track group depending on the track grouping_type. A default behavior may be to select the first track in the file having the specified track_group_id.

The attribute "copy_mode" specifies the copy operation to be performed when resolving the extractor and in particular which syntax structure or data entity to copy (rather than which byte range);

- a copy_mode set to 0: for sample-based copy mode, i.e. a copy of bytes from the first byte of the sample until the end of the sample, inclusive. The first byte of the sample can be determined from the Sample to Chunk Box and Chunk Offset Box;
- a copy_mode set to 1: for NAL Unit-based copy mode, i.e. a copy from the first byte of the i-th NAL Unit to the last byte of this same NAL Unit, where i corresponds to the nalu_idc field; the offset of the first byte to copy is computed by adding the NAL unit length field value augmented by the NAL unit length field size and additional_bytes field in the case of Aggregators of the nalu_idc-1 NAL units. The length of bytes to copy, corresponding to a NAL unit is determined from the length field 211 preceding a NAL Unit 212 in the media data box 'mdat';
- a copy_mode set to 2: for NALU payload-based copy mode; i.e. a copy from the first byte in the i-th NALU payload to the last byte of this same NALU, where i corresponds to the nalu_idc field;
- a copy_mode set to 3: for slice_data-based copy mode, i.e. a copy from the first byte of the i-th slice_data to the last byte of this same slice, where i corresponds to the nalu_idc field. A parser or reader determines the position of the first byte to copy, for example by reading an ISOBMFF structure dedicated to the description of the slice header length;

For the attribute nalu_idc, when copy_mode is NAL Unit-based or slice-based (copy_mode !=0), nalu_idc attribute provides the index (1-based index, meaning starting from value 1) of the NAL unit from where to extract. The value 0 is reserved to indicate that an escape nalu_idc is present to extract beyond the 255-th NALU (for rare case, e.g. HEVC Level 6 where a sample may contain up to 600 slice segments per picture).

escape_nalu_idc: indicates an offset beyond the 255-th NALU from where to start the extraction. When not present, it is assumed to be equal to 0. When present, the value 0 is reserved and could be used if needed for another escape value on 8 bits (not represented) to address from 512$^{th}$ NAL unit. The NAL unit from which to extract is then given by nalu_idc+ escape_nalu_idc.

The NALU payload and slice data based modes are useful when some header rewriting is performed. In such case, only payload is extracted and combined with rewritten header. The rewriting may be described with InlineConstructor. The sample_offset parameter does not appear in the new SampleConstructorFromTrackGroup, assuming that reconstruction is done from time-aligned samples from one of the tracks in the referenced track group. An alternative embodiment providing more flexibility in the extraction consists in keeping the sample_offset parameter in this new SampleConstructorFromTrackGroup. When present, the sample_offset has the same meaning as in ISO/IEC 14496-15. The writer or packager 150 may use such Extractor with specific constructor in the encapsulation step 407, especially when the initialization step 400 indicates that there exist alternative encoded bitstreams or representations of the original sequence 151. A new section defining the new extractor is proposed for inclusion in ISO/IEC 14496-15 so that this new constructor becomes interoperable between File/segment encapsulation means 150 (e.g. mp4 writers) and File/segment de-encapsulating means 100 (e.g. mp4 readers). This SampleConstructorFromTrackGroup may also embed additional parameters like the parameter or the flag indicating whether random access points are aligned across the tracks within the track group with the optional parameter providing the list of switchable tracks when this parameter or flag is set to false.

The Extractors for SVC, 3D-AVC, MVC may be extended as well to support a copy mode on syntax structures or data entities rather than on byte ranges and to extract from track groups. A specific NAL Unit type is reserved to indicate that the Extractor is based on syntax structure extraction (i.e. contains an attribute or parameter indicating the copy_mode), can reference group or set of alternative or equivalent tracks and uses the NAL unit escape mode for NAL unit index indication (here we illustrate with a non-time aligned extraction mode, as indicated by the presence of the "sample_offset" parameter):

```
class aligned(8) StructureExtractor ( ) {
    NALUnitHeader( );
    unsigned    int(8) ref_index;
    signed      int(8) sample_offset;
    unsigned    int(2) copy_mode;
    unsigned    int(6) reserved;
    if (copy_mode !=0 ) { // 0: sample copy mode
        unsigned int(8) nalu_idc; // a 1-based index;
        if (nalu_idc == 0)
            unsigned int(8) escape_nalu_idc; // to address from 256 to 511
    }
}
```

The semantics are the same as explained for SampleConstructorFromTrackGroup. This new Extractor may also embed additional parameters like the parameter or the flag indicating whether random access points are aligned across the tracks within the track group with the optional parameter providing the list of switchable tracks when this parameter or flag is set to false.

Figure 6:
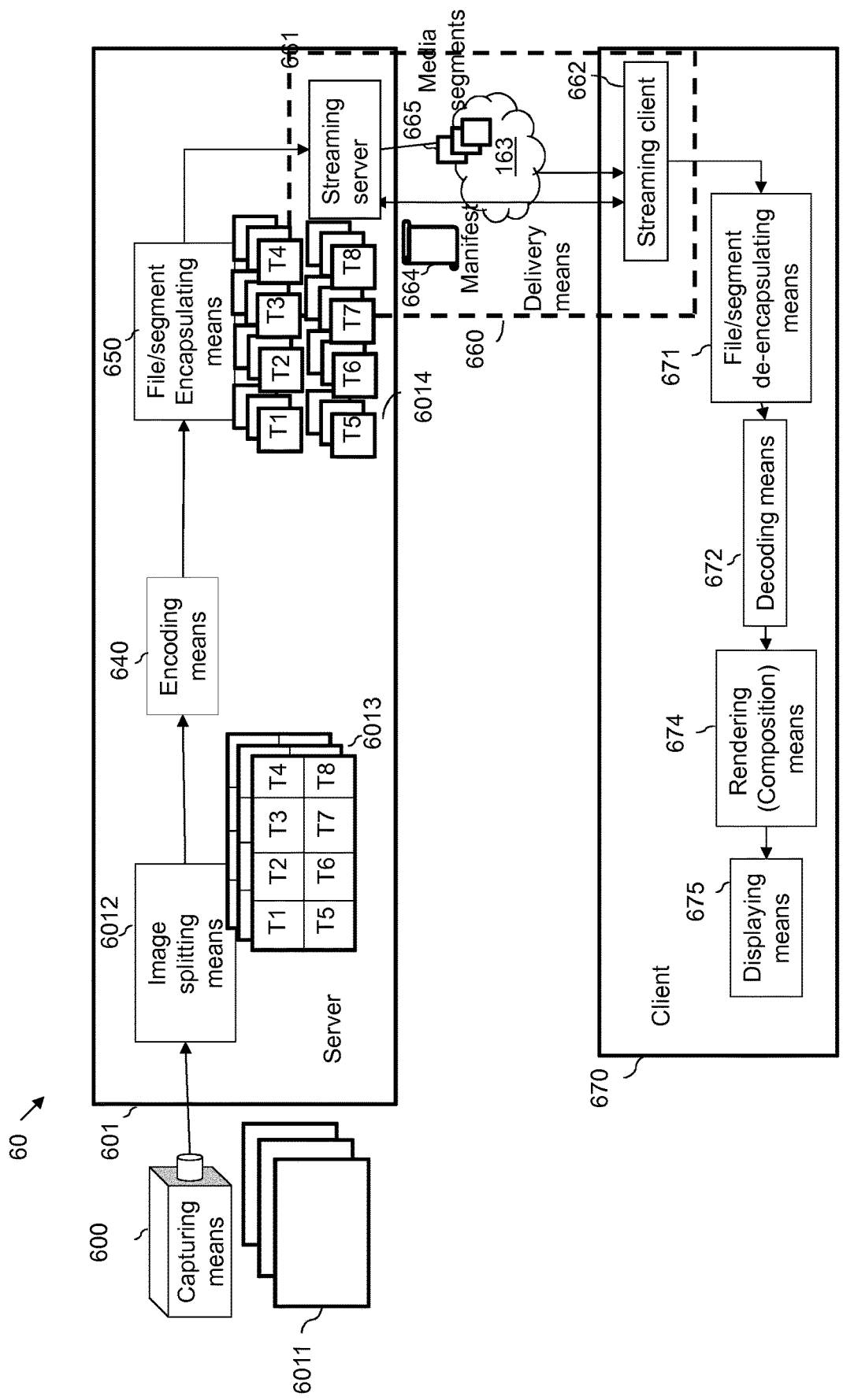
FIG. 6 illustrate a system example for capturing, processing, encapsulating, transmitting, and rendering independently encoded bitstreams from a server to a client.

FIG. 6 illustrates an example of a system 60 implementing an encapsulation and transmitting method. The system 60 allows flowing media content, (for example 2D images). The system 60 comprises a server device 601 and a client device 670, said media content being transmitted from the server device 601 to the client device 670. As illustrated, the media content can be a video sequence 6011 captured by a camera system 600 and delivered to the client device 670, to be displayed on a 2D screen 675 (TV, tablet, smartphone, head mounted display . . . ), by a user for example.

The images 6011 forming the video sequence, are split by splitting means 6012 into spatial parts 6013 to be independently encoded by encoding means 640, in a preferred embodiment. Independently encoded means that one spatial part does not use any data from another spatial part as reference for differential or predictive encoding. For example, when the encoding means 640 is based on HEVC (High Efficiency Video Coding) compression format, the spatial parts 6013 can be encoded as independent tiles. In an alternative embodiment, the spatial parts 6013 can be encoded as motion-constrained tiles. The encoding means provides as many bitstreams as spatial parts or one bitstream with N independent sub-bitstreams (e.g. when HEVC is used for encoding independent tiles). Then, each provided bit-stream or sub-bitstream is encapsulated by File/segment encapsulating means 650 (corresponding to encapsulation module 150) into multiple sub-picture tracks 6014. A sub-picture track is a track embedding data for a sub-part, typically a spatial part or rectangular region, of a picture or image. A sub-picture track may be related to other sub-picture tracks or to the track describing the full picture the sub-picture is extracted from.

For example a sub-picture track can be a tile track. It can also be represented by an AVC track, an HEVC track, an HEVC tile track or any compressed video bitstream encapsulated as a sequence of samples. Sub-picture tracks from a same video source may be grouped using the track group mechanism. For example, OMAF is considering a '2dcc' track_group_type to describe 2D relationships between video tracks.

The packaging or encapsulation format used in 650 can be for example according to ISO Base Media File Format and ISO/IEC 14496-15, as defined by the MPEG standardization organization. Resulting file or segment files can be a single mp4 file or mp4 segments. During the encapsulation, audio stream may be added to the video bit-stream as well as metadata tracks providing descriptive information (metadata) about the video sequence or on the added audio streams.

The encapsulated file or segment files are then delivered to the client device 670 via delivery means 660, for example over IP network like Internet using http (HyperText Transfer Protocol) protocol or on a removable digital medium such as for example a disk or a USB key. For the sake of illustration, the delivery means 660 implement an adaptive streaming over HTTP such as DASH (Dynamic Adaptive Streaming over HTTP) from the MPEG standardization committee ("ISO/IEC 23009-1, Dynamic adaptive streaming over HTTP (DASH), Part1: Media presentation description and segment formats"). The delivery means may comprise a streaming server 661 and a streaming client 662. The media presentation description may provide description and URLs for media segments corresponding to the track encapsulating a video sequence comprising full images or to the sub-picture tracks only or both. The media presentation description may provide alternative groups of sub-picture tracks, each group allowing different reconstruction level of the scene captured by the camera 600. Alternative can be for example in terms of resolution, quality or bitrate, different splits (coarse or fine grid associated with the splitting means 6012).

Upon reception by the streaming client 662, the encapsulated media file or media segments are parsed by File/segment de-encapsulating means 671 (corresponding to de-encapsulating module 100) so as to extract one or more data streams. The extracted data stream(s) is/are decoded at by decoding means 672. In case of ISOBMFF file or segments received by the File/segment de-encapsulating means 671, the parsing is typically handled by an mp4 reader or mp4 parser. From the descriptive metadata, the parser can extract encapsulated video bitstreams and/or video sub-bitstreams.

Next, optionally the decoded images or sub-images of the video sequence provided by the decoding means 672 are composed by rendering means 674 into resulting images for video rendering. The rendered video is and displayed on displaying means 675 like a screen (user device).

It is to be noted that video rendering depends on several parameters among which is the display size or the processing power of the client. The rendering may then consist in displaying only a subset of the parsed and decoded sub-picture tracks. This may be controlled by the rendering means 674 or directly in content selection by the streaming client 662.

It has been observed that transmission and rendering of several images of VHD (for 'Very High Definition') video streams may lead to a very high bitrate and very high resolution media data stream. Therefore, when taking into account the whole system, to avoid wasting bandwidth and to remain compliant with processing capabilities of the client players, there is a need to optimize access to the media data.

In particular, a media data stream can be used for displaying images with dedicated displays like an array of projectors. It can also be used to display particular region of interest in the captured video 6011.

Figure 7:
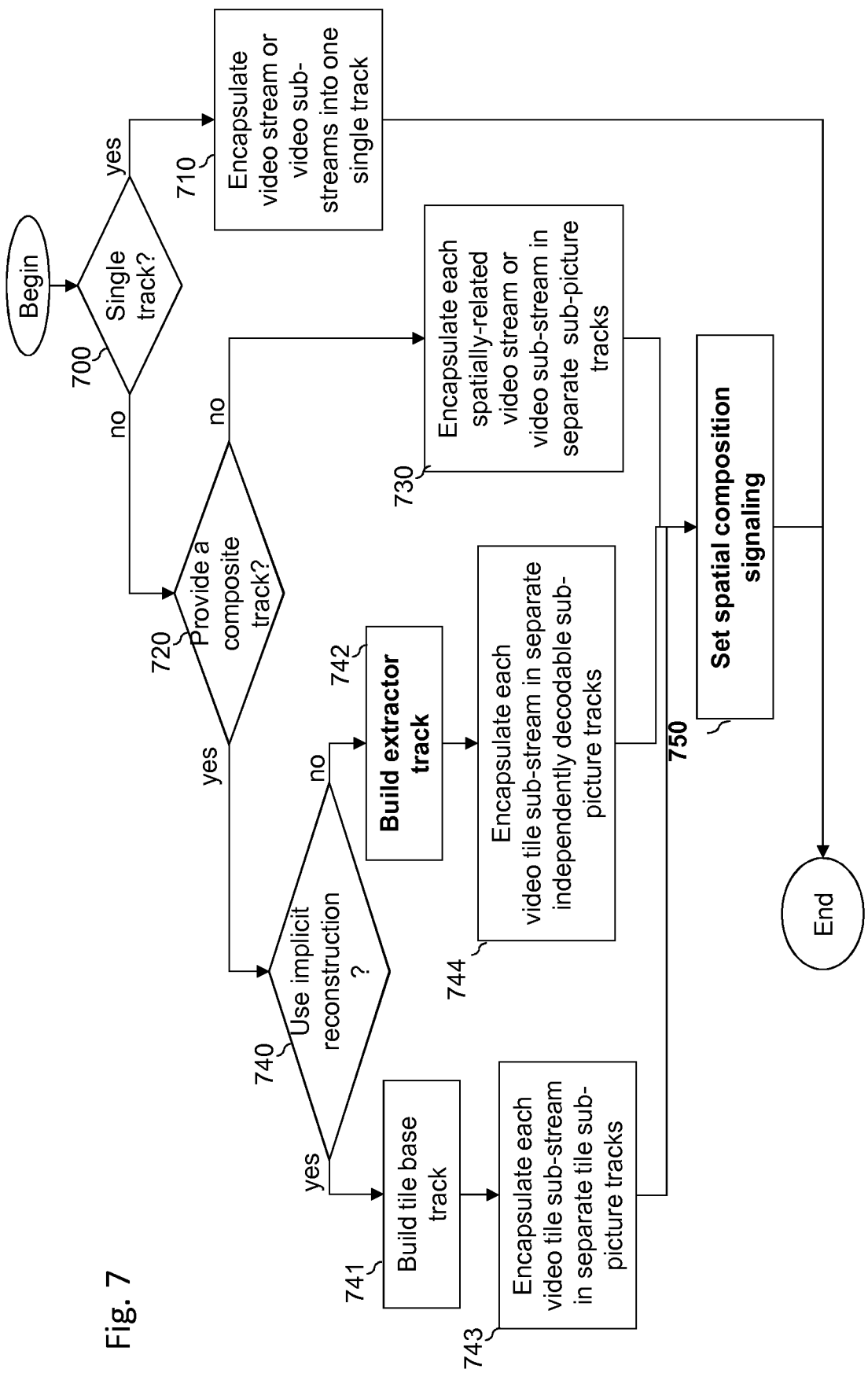
FIG. 7 illustrates a process for encapsulating 2D video into multiple tracks.

FIG. 7 illustrates a process for encapsulating (by means 650) of 2D video into multiple tracks. At step 700, the server determines whether the input bitstream(s) after encoding, are to be encapsulated as a single or multiple tracks. If single track encapsulation is on (test 700 is 'yes'), the video is encapsulated as a single track (step 710), optionally with a NAL unit mapping indicating which NAL units correspond to which region. If multiple tracks have to be generated (test 700 is 'no'), for example when a split is performed by means 6012 in FIG. 6, then in step 720, the content creator of the files may add a composite or reconstruction track. A composite or reconstruction track allows providing an entry point or a "main" or "default" track for the parsers or players. For example, the composite or reconstruction track has the flags values set in the track header indicating that it is enabled and that it is used in movie and optionally as preview. The tracks referenced by the composite tracks may not have these flags value set (except the track_enable flags value) to hide these tracks from selection by clients or players or users. When there is no composite or reconstruction track, the media file and each bitstream or sub-bitstream after encoding is encapsulated in its own track in step 730.

An optional step may consist in reducing the number of tracks by gathering bitstreams or sub-bitstreams to form bigger regions than the original split ones. When the encapsulation provides a composite or reconstruction track (test 720 is 'yes'), two options are possible for a sample reconstruction rule: implicit or explicit reconstruction indication in the media file.

For implicit reconstruction (test 740 is 'true', branch 'yes'), the composite or reconstruction track is provided as a tile base track (e.g. tracks with 'hvt1' sample entry) as defined by ISO/IEC 14496-15 in step 741. Then each sub-picture track is encapsulated as a tile track depending on this tile base track in step 743, as specified in ISO/IEC 14496-15. Note that in addition to the 'trif' descriptor for tile tracks, each tile track may also be declared as part of a same track group for 2D spatial relationship description.

If the composite or reconstruction track is provided as a track with extractor for explicit reconstruction (test 740 is 'false', branch 'no'), an additional track is created in the media file at step 742. This track mainly contain Extractors according to embodiments of the invention, i.e. allowing the copy of syntax structures (data entities) like samples, NAL units or slices. This track may also allow extraction from a set or a group of alternative or equivalent tracks like the new Extractor or Constructor according to previous embodiments. The created track references each sub-picture track created in step 744, for example with a 'scal' track reference type. If no composite or reconstruction track is provided (test 720 is 'false', branch 'no'), then the video part of the media is encapsulated as sub-picture tracks in a step 730. Note that even if a composite or reconstruction track is present, the sub-picture track may also be grouped vie via the track group mechanism.

Finally, the description for spatial composition and the relationship between the sub-picture tracks is generated at step 750. A track group box for 2D spatial relationship description is added to each sub-picture track to describe the relative positions and sizes of each sub-picture track within the original video source.

Figure 8:
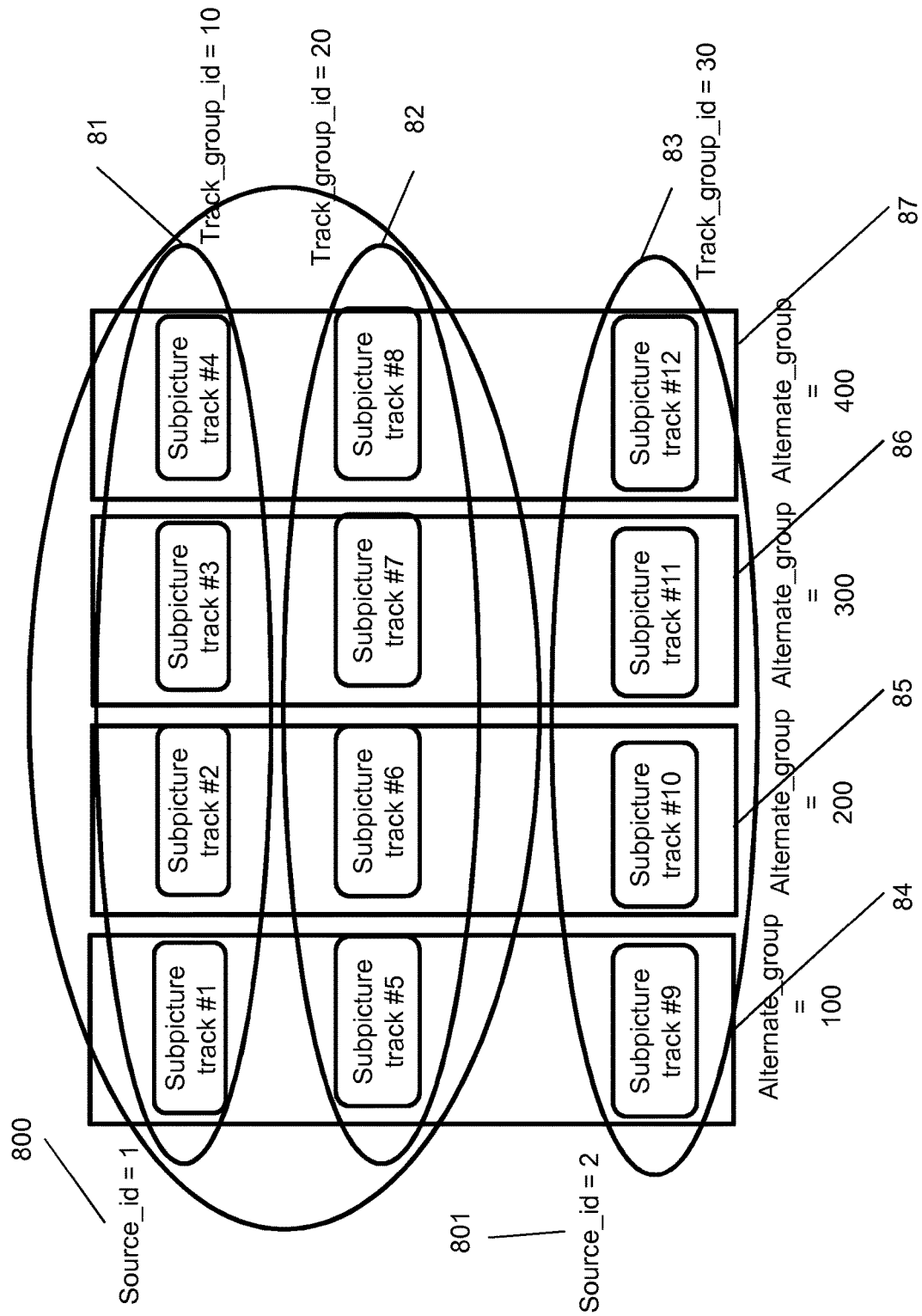
FIG. 8 describes an example of sub-picture track encapsulation containing several track groups for 2D spatial relationships description.

FIG. 8 describes an example of sub-picture track encapsulation containing several track groups for 2D spatial relationships description. This example applies for both 2D or omnidirectional video.

In this example, Tracks #1 to #4 belong to a track group 81 of type '2dcc' with track_group_id equals to 10 and source_id 800 equals to 1. Tracks #5 to #8 belong to a different track group 82 of type '2dcc' with track_group_id equal to 20 but with the same source_id 800 equals to 1. There is also a third track group 83 of type '2dcc' with a track_group_id equals to 30 and a different source_id 801 equal to 2. In addition, there are several alternate groups 84 to 87. All tracks that belong to the same alternate group (i.e. that have the same alternate_group identifier in their track header box 'tkhd' or they all declare a 'trgr' box with the same track_group_type and track_group_id) specify a group or collection of tracks containing alternate data. Alternate data may correspond to alternate bitrate, codec, language, packet size etc. These differentiating attributes may be indicated in a track selection box. Only one track within an alternate group should be played or streamed at any one time. In this example, Tracks #1, #5 and #9 belong to the same alternate group 84 with identifier equal to 100. For instance, track #1 and track #5 are alternate tracks with different qualities, and track #9 is an alternate track to track #1 and track #5 in terms of codec. Tracks #2, #6 and #10 belong to the same alternate group 85 with identifier equal to 200, For instance, track #2 and track #6 are alternate tracks with different resolutions, and track #10 is an alternate track to track #2 and track #6 in terms of frame rate, etc. . . . , and so on.

The track groups 81 and 82 have the same source_id 800 and the track group 83 has a different source_id 801 meaning that sub-picture tracks belonging to track groups 81 and 82 can be combined together (with respect to other constraints, i.e. almost one sub-picture track per alternate group). On contrary, sub-picture tracks from track group 83 are not intended to be combined with any sub-picture tracks from track groups 81 and 82 despite they may belong to a same alternate group because they do not have the same source_id. The source_id parameter then provides an indication to the players on the sub-picture tracks that can be part of a same spatial composition. For a given spatial position, one sub-picture track can be considered visually equivalent to another sub-picture track at the same given spatial position. This is useful for (sub-picture) track selection when the media content is provided into multiple tracks. Moreover, it allows dynamic adaptation (in quality/bitrate or resolution) to display a same spatial composition, depending on the selected the sub-picture tracks. The configuration of FIG. 8 allows a writer or packager in 650 (FIG. 6) or 150 (FIG. 1) to build a reconstruction or composition track to arrange the spatial parts of the different tracks into a bigger image to render. According to embodiments of the invention, the reconstruction or composition track uses the proposed Extractor with the different copy modes and able to reference a track group. This is useful to indicate, for example that the spatial part corresponding to track #1 or track #5 may be reconstruct by one of these two tracks. This is indicated by a writer or packager with an Extractor referencing the alternate group equal to 100 (84). As well, the data for the second spatial part can be extracted from one track of the alternate group 85. Again the reconstruction track contains Extractor with copy_mode set to "sample" mode and referencing a track group.

FIGS. 9a and 9b illustrate example of explicit reconstruction from a set or from a group of tracks. In the illustrated example, the groups of tracks correspond to alternative sets of sub-picture tracks.

According to embodiments of the invention, the new kind of Extractor is used in the extractor or reconstruction track like 900 in FIG. 9a or 950 on FIG. 9b. The FIGS. 9a and 9b show a specific track reference type 'esra' 901 or 951 to indicate "explicit spatial reconstruction with alternatives. A track reference of type 'scal' may be used instead. The step "Track Selection" 902 or 952 corresponds to the step done by the parser to select a track within the track group referenced by the track group by 901 or 951. FIG. 9a is quite similar to the configuration on FIG. 8, i.e. alternative tracks are indicated by a track group of type 'alte' (903 and 904) while FIG. 9b considers an alternative way of describing alternative tracks, for example using subsets (953 and 954) The subset is identified by a unique identifier that may also be used as ref_index in the specific SampleConstructorWithAlternatives (track 950 with ID #100). The subset identifier can be declared as a parameter in the '2dsr' box. The use of a subset_identifier costs 4 bytes per sub-picture track where the declaration of 'alte' track costs 24 bytes per sub-picture track.

Figure 10:
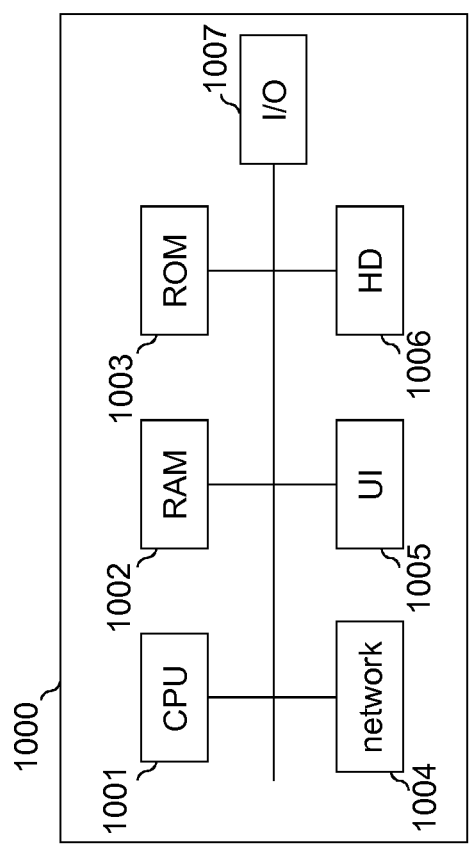
FIG. 10 is a schematic block diagram of a computing device for implementation of one or more embodiments of the invention.

FIG. 10 is a schematic block diagram of a computing device 1000 for implementation of one or more embodiments of the invention. The computing device 1000 may be a device such as a micro-computer, a workstation or a light portable device. The computing device 1000 comprises a communication bus connected to:
- a central processing unit (CPU) 1001, such as a microprocessor;
- a random access memory (RAM) 1002 for storing the executable code of the method of embodiments of the invention as well as the registers adapted to record variables and parameters necessary for implementing the method for reading and writing the manifests and/or for encoding the video and/or for reading or generating data under a given file format, the memory capacity thereof can be expanded by an optional RAM connected to an expansion port for example;
- a read only memory (ROM) 1003 for storing computer programs for implementing embodiments of the invention;

a network interface 1004 that is, in turn, typically connected to a communication network over which digital data to be processed are transmitted or received. The network interface 1004 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 1001;

a user interface (UI) 1005 for receiving inputs from a user or to display information to a user;

a hard disk (HD) 1006;

an I/O module 1007 for receiving/sending data from/to external devices such as a video source or display.

The executable code may be stored either in read only memory 1003, on the hard disk 1006 or on a removable digital medium such as for example a disk. According to a variant, the executable code of the programs can be received by means of a communication network, via the network interface 1004, in order to be stored in one of the storage means of the communication device 1000, such as the hard disk 1006, before being executed.

The central processing unit 1001 is adapted to control and direct the execution of the instructions or portions of software code of the program or programs according to embodiments of the invention, which instructions are stored in one of the aforementioned storage means. After powering on, the CPU 1001 is capable of executing instructions from main RAM memory 1002 relating to a software application after those instructions have been loaded from the program ROM 1003 or the hard-disc (HD) 1006 for example. Such a software application, when executed by the CPU 1001, causes the steps of the flowcharts shown in the previous figures to be performed.

In this embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a person skilled in the art which lie within the scope of the present invention.

For example, the present invention may be embedded in a device like a camera, a smartphone, a head-mounted display or a tablet that acts as a remote controller for a TV or for multimedia display, for example to zoom in onto a particular region of interest. It can also be used from the same devices to have personalized browsing experience of a multimedia presentation by selecting specific areas of interest. Another usage from these devices and methods by a user is to share with other connected devices some selected sub-parts of his preferred videos. It can also be used with a smartphone or tablet to monitor what happens in a specific area of a building put under surveillance provided that the surveillance camera supports the method for providing data according to the invention.

Many further modifications and variations will suggest themselves to those versed in the art upon making reference to the foregoing illustrative embodiments, which are given by way of example only and which are not intended to limit the scope of the invention, that scope being determined solely by the appended claims. In particular the different features from different embodiments may be interchanged, where appropriate.

The invention claimed is:

1. A method for encapsulating a media sample into a media file, the method comprising:
including, in the media file, a track group having a plurality of tracks comprising media samples, each media sample containing a set of one or more NAL units;
including, in the media file, an extractor, the extractor being a structure referencing the track group and referencing a data entity in a media sample contained in at least one of the plurality of tracks of the referenced track group; and
including, in the extractor, an index of a NAL unit contained in the media sample and a copy mode attribute that identifies, in the media sample, the referenced data entity relatively to the NAL units corresponding to the index.

2. The method of claim 1, wherein the copy mode attribute is set to one of a list of one or more modes.

3. The method of claim 2, wherein the list of modes comprises one or more of the following modes:
a first mode in which the data entity comprises all the set of NAL units contained in the media sample;
a second mode in which the data entity comprises one NAL unit of the set of NAL units;
a third mode in which the data entity comprises the payload of one NAL unit of the set of NAL units;
a fourth mode in which the data entity comprises a NAL unit at a specified position in the set of NAL units; and
a fifth mode in which the data entity comprises a payload of a NAL unit at a specified position in the set of NAL units.

4. The method of claim 3, wherein in the second or third modes, the NAL unit is the first NAL unit in the media sample.

5. The method of claim 3, wherein in the second or third modes, the NAL unit is the last NAL unit in the media sample.

6. A method for generating a media file, comprising:
encoding media content into media data;
encapsulating the media data into the plurality of tracks, according to the encapsulating method of claim 1; and
generating at least one media file comprising the encapsulated media data.

7. A method of transmitting a media file, comprising:
generating a media file by a server device according to claim 6; and
transmitting the generated media file to a client device.

8. A method for parsing a media file to generate media data, the method comprising:
obtaining, from the media file, a track group having a plurality of tracks comprising media samples, each media sample containing a set of one or more NAL units;
obtaining, from the media file, an extractor, the extractor being a structure referencing the track group and referencing a data entity in a media sample contained in at least one of the plurality of tracks of the referenced track group; and
obtaining, from a media sample contained in at least one of the plurality of tracks of the track group, a data entity identified by a copy mode attribute and an index of a NAL unit contained in the media sample included in the extractor;

wherein the copy mode attribute identifies, in the media sample, the referenced data entity relatively to the NAL unit corresponding to the index.

9. A computing device for encapsulating a media sample into a media file, the computing device being configured for:
including, in the media file, a track group having a plurality of tracks comprising media samples, each media sample containing a set of one or more NAL units;
including, in the media file, an extractor, the extractor being a structure referencing the track group and referencing a data entity in a media sample contained in at least one of the plurality of tracks of the referenced track group; and
including, in the extractor, an index of a NAL unit contained in the media sample and a copy mode attribute that identifies, in the media sample, the referenced data entity relatively to the NAL unit correspond to the index.

10. A computing device for parsing a media file to generate media data, the computing device being configured for:
obtaining, from the media file, a track group having a plurality of tracks comprising media samples, each media sample containing a set of one or more NAL units;
obtaining, from the media file, an extractor, the extractor being a structure referencing the track group and referencing a data entity in a media sample and comprising an index of a NAL unit contained in the media sample and a copy mode attribute contained in at least one of the plurality of tracks of the track group; and
obtaining, from a media sample contained in at least one of the plurality of tracks of the track group, a data entity identified by the copy mode attribute included in the extractor;
wherein the copy mode attribute identifies, in the media sample, the referenced data entity relatively to the NAL unit corresponding to the index.

11. A non-transitory computer-readable storage medium storing instructions of a computer program for implementing a method according to claim 1.

12. A method for encapsulating a media sample into a media file, the method comprising:
including, in the media file, a plurality of tracks comprising media samples, each media sample containing a set of one or more NAL units;
including, in the media file, an extractor comprised in at least one of the plurality of tracks, the extractor being a structure referencing a data entity in a media sample contained; and
including, in the extractor, an index of a NAL unit contained in the media sample and a copy mode attribute that identifies, in the media sample, the referenced data entity relatively to the NAL unit corresponding to the index.

13. A method for parsing a media file to generate media data, the method comprising:
obtaining, from the media file, a plurality of tracks comprising media samples, each media sample containing a set of one or more NAL units;
obtaining, from the media file, an extractor comprised in at least one of the plurality of tracks of the track group, the extractor being a structure referencing a data entity in a media sample and comprising an index of a NAL unit contained in the media sample and a copy mode attribute; and
obtaining, from a media sample contained in at least one of the plurality of tracks of the track group, a data entity identified by the copy mode attribute included in the extractor;
wherein the copy mode attribute identifies, in the media sample, the referenced data entity relatively to the NAL unit corresponding to the index.

* * * * *